United States Patent [19]
Hayes et al.

[11] Patent Number: 5,218,684
[45] Date of Patent: Jun. 8, 1993

[54] MEMORY CONFIGURATION SYSTEM

[75] Inventors: Dennis F. Hayes, Westford; Victoria M. Triolo, Boylston, both of Mass.

[73] Assignee: Digital Equipment Corporation, Maynard, Mass.

[21] Appl. No.: 681,618

[22] Filed: Apr. 1, 1991

Related U.S. Application Data

[63] Continuation of Ser. No. 93,580, Sep. 4, 1987, abandoned.

[51] Int. Cl.[5] .................................................. G06F 12/00
[52] U.S. Cl. ........................... 395/400; 364/DIG. 1; 364/228.1; 364/245; 364/245.31
[58] Field of Search ... 364/200 MS File, 900 MS File; 395/425, 400

[56] References Cited

U.S. PATENT DOCUMENTS

| | | | |
|---|---|---|---|
| 4,236,207 | 11/1980 | Rado et al. | 364/200 |
| 4,268,901 | 5/1981 | Subrizi et al. | 364/200 |
| 4,293,908 | 10/1981 | Bradley et al. | 364/200 |
| 4,340,933 | 7/1982 | Miu et al. | 364/200 |
| 4,450,521 | 5/1984 | McDonough et al. | 364/200 |
| 4,500,962 | 2/1985 | Lemaire et al. | 364/200 |
| 4,519,032 | 5/1985 | Mendell | 364/200 |
| 4,571,671 | 2/1986 | Mantellina et al. | 364/200 |
| 4,727,475 | 2/1988 | Kiremidjian | 395/425 |
| 4,740,916 | 4/1988 | Martin | 364/900 |
| 4,744,025 | 5/1988 | Lipcon et al. | 395/425 |

*Primary Examiner*—Michael R. Fleming
*Assistant Examiner*—Debra A. Chun
*Attorney, Agent, or Firm*—Kenyon & Kenyon

[57] ABSTRACT

A system permitting configuring of its total memory space includes a processor, an external operating device having a first address space and a bus coupling said central processing unit and the operating device. A starting address for the total memory space is defined and the operating device calculates its own starting address from the starting address of the total space.

18 Claims, 9 Drawing Sheets

FIG. 3

| HEX ADDRESS | |
|---|---|
| 2000 0000 | NODE 0 |
| 2000 2000 | NODE 1 |
| 2000 4000 | NODE 2 |
| 2000 6000 | NODE 3 |
| 2000 8000 | NODE 4 |
| 2000 A000 | NODE 5 |
| 2000 C000 | NODE 6 |
| 2000 E000 | NODE 7 |
| 2001 0000 | NODE 8 |
| 2001 2000 | NODE 9 |
| 2001 4000 | NODE 10 |
| 2001 6000 | NODE 11 |
| 2001 8000 | NODE 12 |
| 2001 A000 | NODE 13 |
| 2001 C000 | NODE 14 |
| 2001 E000 | NODE 15 |

MEMORY CONFIGURATION SYSTEM

This is a continuation of application Ser. No. 093,580, filed Sep. 4, 1987, now abandoned, entitled MEMORY CONFIGURATION SYSTEM.

BACKGROUND OF THE INVENTION

A. Field of the Invention

This invention relates to a digital computer memory system and, more particularly, to a method and apparatus for configuring additional memory used with a stand alone digital computer system including a single board central processing unit and limited on-board memory. The invention provides an efficient memory system configuration adaptable to accommodate and effectively utilize additional memory that is not of a predetermined size and also that is not physically restricted to be connected in any specific backplane slot.

B. Prior Memory Systems

Previously designed methods of determining the amount of memory hidden behind a memory bus interface utilize a method known as fingerprinting. This method requires physical connections to be reserved on a memory bus which connect each memory board to the memory controller logic. These connections, which are referred to as bus lines, are defined to indicate that a memory board is present, the number of memory boards present and, in encoded form, the density of such memory boards. This requires a fairly large amount of logic in the memory controller of the computer system and also requires the dedicated use of a large number of bus lines. Because of this, in prior art systems changing the amount of memory connected required the services of a skilled technician to set the necessary switches to indicate the amount of memory connected.

One of the functions that the memory controller logic performs is to determine the amount of memory present. This information is encoded on dedicated memory bus lines which are connected between the memory controller logic and each memory board. Thus, the number of physical bus lines dedicated to transmitting this memory density information is directly proportional to the number of memory boards such system supports.

In the prior art, the physical location of memory boards in the system is restricted. The location of the board depends on the density of the memory contained on the board. The higher density boards have to be physically closer to the memory controller than the lower density boards. The essence of the fingerprinting method is that it depends on certain things to be in a certain sequence. Thus, a memory board which contains 1 Mbyte (1,048,576 bytes) of memory space could not be connected to the memory bus in the same physical location that a 2 Mbyte (2,000,000 bytes) or more memory board would be connected.

Much of the memory controller logic is for the starting address offset function. The rest of the logic is required because the information output by the memory boards is "dumb" information, that is, each memory board knows only about itself. The boards do not know if there are other memory boards connected the memory bus. Also, the prior art has no facility for the memory boards to encode data. For every piece of information that each memory board needs to supply the memory controller, there has to be a bus line dedicated for that information.

While the prior art is a very adequate method of configuring and controlling memory, there is a need for advancement. In particular, in a single board computer system most of the intelligence must be placed on one board. Since there are physical limitations in the amount of logic that a single board can support and also limitations in the number of external physical connections such board can support, there is a need to economize both. The prior art does not adequately address these limitations.

SUMMARY OF THE INVENTION

Accordingly, it is a primary objective of the present invention to provide a memory configuration scheme which allows maximum flexibility in memory board density and physical location of such memory boards while minimizing the required memory controller logic and electrical interface connections.

Generally, the system of the present invention comprises a single board computer with a processor and a limited memory connected by a bus arrangement to a memory subsystem or to other single board central processing units which may be further connected to a memory subsystem. In the illustrated embodiment, the single board computer also has another bus interface through which it may access I/O devices or other similar single board computer systems.

The method which the system of the present invention utilizes for memory configuration is to have a daisy chained, uni-directional configuration bus that encodes the amount of memory present by adding on each memory node the amount of memory present on that node to an amount input from previous nodes on the chain. The term "daisy chain" in the system of the present invention implies a method of sequentially connecting a series of devices such that the output connection of device one is the input connection of device two, the output connection of device two is the input connection of device three and so on. This method of connecting the output of one device to the input of the next device is repeated to accommodate all devices. A "memory node" in the system of the present invention refers to the points at which a device may be connected. The resultant output sum indicates the total amount of memory present on the configuration bus at that node in an encoded form. This resultant output sum can then be compared to any physical address generated by the CPU.

Each memory node calculates its output sum by adding the amount of memory present at its node to the amount input from previous nodes. This method allows each memory node to be self-configuring as to the addresses to which it will respond. There is no constraint on the order of memory arrays by capacity or on the number of CPUs which may access the memory if appropriate arbitration logic is present.

The logic required to accomplish this daisy chained memory configuration scheme could be large if some constraints were not placed on the range of total amount of memory possible and the minimum increments of memory to be supported. Thus, in the system of the present invention, such constraints are enforced and the required logic is distributed among the nodes on the configuration bus.

Accordingly, the present invention achieves maximum flexibility for a memory system by providing a daisy chained configuration which allows each node on the configuration bus to be self configuring and places no constraints on the order of memory arrays. The present invention achieves the above while minimizing the amount of logic and the number of physical connections on the configuration bus for the implementation.

Furthermore, there is no need to have a skilled technician to add memory. An extra memory board need only be plugged in and the system of the present invention will detect and be able to use the additional memory.

BRIEF DESCRIPTION OF THE DRAWINGS

FIG. 3 depicts the system bus node space assignments of the system of FIG. 1.

DETAILED DESCRIPTION

System Overview

Figure 1:
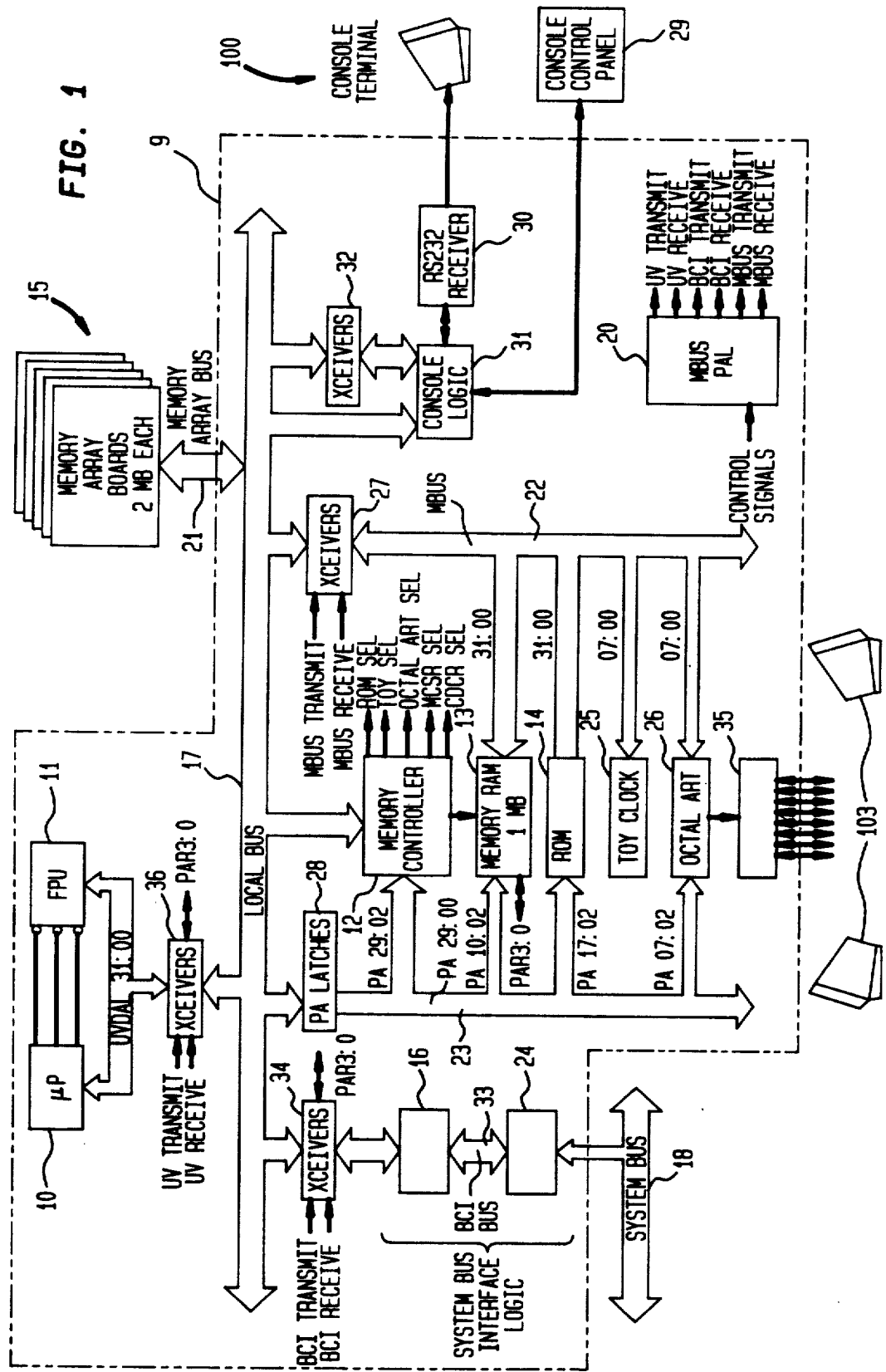
FIG. 1 is a block diagram of a computer system employing the present invention.

Referring now to the drawings and initially to FIG. 1, illustrated in block diagram form, is a system configuration according to the present invention. The system includes a single chip microprocessor 10, a floating point coprocessor 11, a memory controller 12, a local RAM 13, a local ROM 14, an off board memory 15, a time of year (TOY) clock 25, an Octal ART 26, a PAL 20, a system bus interface 16 and 24, latches 28 and transceivers 27, 32, 34, and 36. The system components 10, 11, 12, 13, 14, 15, 16 are interfaced with one another by means of a bus 17. The system components 10, 11, 12, 13, 14, 15, 17 are interfaced through the bus interface 16 to bus 18.

A preferred system configuration for advantageous implementation of the teaching of the invention comprises a single board computer module 9 which contains system components 10, 11, 12, 13, 14, 16, 24, 25, 26, 20, 28, 27, 32, 34, 30, 31 and BUS 17. The single board computer may be a module which is a 32-bit, single-board processor that provides VAX functionality. The module is compatible with system bus 18 which is manufactured by Digital Equipment Corporation and hereinafter referred to as the system bus. The term "VAX" refers to a product line manufactured by Digital Equipment Corporation.

The module 9 may function either as a primary or a secondary CPU in a larger computer configuration. The module 9 thus serves as a computational engine for an operating system and for user application programs.

The module 9 implements console functions. A console 100 provides the user interface to the module 9 and to the system configuration in which it is used. Through console 100, a user can bootstrap the system image, invoke diagnostic routines, examine or write to registers and memory throughout the system via bus 18 configuration, and interactively communicate with the operating system and application programs.

In addition to a console interface, the module 9 provides an asynchronous serial interface 35 (RS-232C compatible) for up to eight terminals 103. The terminals operate independently of the console subsystem.

The module 9 has extensive on-board diagnostics. On power-up or node reset, it tests itself and makes its status (pass or fail) available over the system bus 18. A set of LEDs on the printed circuit board of module 9 also indicates the outcome of self-test. In addition, a user can invoke other on-board diagnostics to test the logic and functions of module 9 more extensively.

The microprocessor chip 10 in the illustrated embodiment is a 32-bit, virtual-memory processor chip. Chip 10, for example, can directly address a 1 Gbyte physical address space.

The floating-point unit 11 (78132) is a single-chip, floating-point processor 11 that functions as a slave to the processor 10. The floating-point unit (FPU) performs 32-bit, floating-point computation and accelerates the execution of certain integer and character-string instructions.

The local bus 17 is a 32-bit, asynchronous, bidirectional bus that connects the processor 10 with on-board memory 13 and 14 and on-board devices. The local bus 17 is time-multiplexed so that address information and data are transmitted over the same lines during different cycles of transaction.

The local bus transceivers 36, 34, and 27, respectively, interface the local bus 17 with the processor 10, the chip 16, and components on the memory bus 22 (MBUS). The processor 10 and chip 16 transceivers generate byte parity on writes and check byte parity on reads. The bus transceivers are controlled by the MBUS PAL 20.

The memory bus 22 (MBUS) connects local memory, as well as other devices, to the local bus 17. The MBUS 22 is a 32-bit data bus that interfaces with the local bus 17 through transceiver 27. With the exception of the real-time clock chip 25, the MBUS devices are addressed over a physical address (PA) bus 23. During the address part of a local bus cycle, local bus address bits [29:0] are latched by the PA latches 28.

The module 9 has 1 Mbyte of on-board RAM 13. Byte parity is generated for RAM writes, and it is checked on RAM reads. The RAM can be backed up by batteries.

The module 9 has 128 Kbytes of ROM at 14 that stores firmware to perform initialization routines, the primary bootstrap routine, console program code, diagnostic routines and in-circuit tester pattern-generating code. The module 9 can accommodate up to 256 Kbytes of ROM.

The memory controller 12 controls access to the physical address space. The memory controller 12 decodes the address on the PA bus 23, enables the appropriate device, and returns status information to the local bus master. The memory controller 12 also drives onboard RAM 13 and provides refresh timing for all local RAM, which includes off-board RAM on memory array modules 15.

Pursuant to the teachings of the present invention, on power-up or node reset, the primary processor in the system, which could be the module 9 itself, assigns the module 9 a starting address offset (SAO). The SAO represent the base address for local RAM within system physical memory space. The memory controller 12 uses the SAO to decode memory references. If the module 9 is not the primary processor, the console software assigns the starting address from the system Starting Address Register.

The memory array bus 21 is an off-board extension of the local bus 17. The memory array bus 21 connects the module 9 with daisy chained memory array boards 15 in accordance with the present invention. The memory array bus 21 thus allows the module 9 to access an extended main memory.

Each memory array board 15 contains 2 Mbytes of dynamic RAM implemented on 256 Kbit memory chips. Up to five memory array boards 15 can be daisy chained to module 9 memory array bus 21. Main memory can thus be expanded to a total of 11 Mbytes (1 Mbyte on-board plus 10 Mbyes on memory array boards 15).

Pursuant to the present invention, the local bus master recognizes there is no distinction between the on-board RAM 13 and memory array board 15. The access time and other operating characteristics are identical. Memory array board 15 can also be backed up by batteries.

The local bus 17 and the system bus 18 interface through interface chips 16 and 24. Chip 24 is a standard user interface to the system bus 18. The chip 16, which connects to the chip 24 through a bus 33, is a memory-mapped peripheral device of the processor 10.

The chip 16 is the window of module 9 onto the system bus 18. When the processor 10 references a non-local physical address, the chip 16 translates the local bus 17 transaction into a transaction on the system bus 18. When another system node addresses the module 9, the chip 16 translates the incoming system transaction into a local bus 17 transaction.

The chip 24 implements the system bus 18 commands and performs system error checking and arbitration.

The console 100 is the primary user interface to module 9 and to the system computer system as a whole. The console consists of an RS-232C interface 30, a control panel 29, and console firmware that implements console commands. A DLART (DIGITAL Link asynchronous receiver/transmitter) chip provides parallel-to-serial and serial-to-parallel conversion between the processor chip 10 and the RS-232C transceivers 30.

The console has two operating modes: program mode and console mode. In program mode, characters typed at the console terminal are passed to the operating system; this is the normal operating mode (run mode). In console mode, characters typed at the console terminal are interpreted as console commands; the operating system and all application programs are suspended.

The module 9 provides an asynchronous serial interface 35 (RS-232C compatible) for up to eight terminals 103. This interface is implemented in an octal ART 26 (octal asynchronous receiver/transmitter) chip. The octal ART 26 supplies eight independently programmed serial lines. One line (line 0) has modem-control signals that enable communication with a modem.

The module 9 provides a time-of-year (TOY) clock and a real-time clock. Both clock functions are implemented in the Motorola RTC chip 25 (MC146818). This chip 25 calculates and stores the time and date during system operation. The TOY clock 25 has 50 bytes of battery-backed up RAM used by the console firmware to store the state of processor 10 when console mode is entered. The real-time function permits programmable interrupts to the processor chip 10.

Local Bus

The local (integrated circuit interconnect) bus 17 is a 32-bit, asynchronous, bidirectional bus. The local bus 17 interfaces the processor chip 10 with local memory and on-board logic and supports direct memory access (DMA) transfers to and from local memory and the system bus.

The local bus 17 is time-multiplexed. That is, address information and data are transmitted over the same lines during different parts of the bus cycle. Toward the beginning of the cycle, the address is transmitted. Toward the end of the cycle, data is transmitted.

Communication between any two devices on the local bus 17 takes place within a master/slave relationship. The bus master initiates and controls the transaction. The slave responds to the bus master's commands and returns appropriate status information. The local bus 17 is an interlocked bus in that only one transaction can be on the bus at any given time.

Data transfers on the local bus 17 occur on naturally-aligned longword (32-bit) boundaries. For example, memory fetches occur on address boundaries ending in 0, 4, 8 and C (hex). The bus master asserts the appropriate Byte Mask lines to indicate which bytes within a transferred longword contain valid data.

Figure 2:
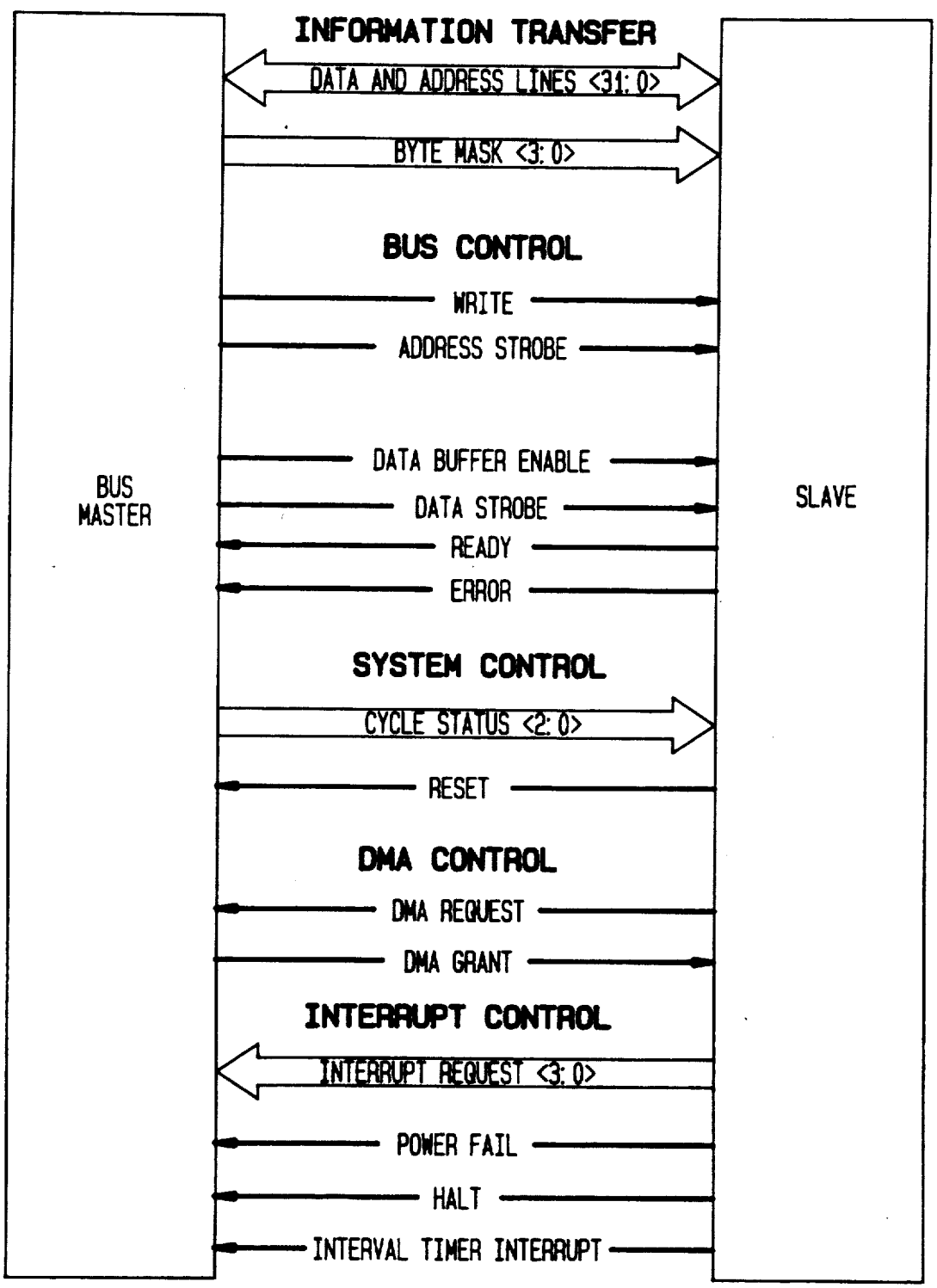
FIG. 2 is an illustration of the local bus structure of the system of FIG. 1.

The local bus 17's data and control signals are divided into classes. FIG. 2 depicts the local bus 17 structure and also delineates the classes of signals. The first class is information transfer signals and that encompasses 32 data and address lines and 4 lines for byte mask information. The second class is bus control and it entails control signals such as write, address strobe, data buffer enable, data strobe, ready and error. The third class of signals is system control which is comprised of 3 lines of cycle status and reset. The fourth class of signals is DMA (direct memory access) control which contains DMA request and DMA grant. The last class of signals is interrupt control which is comprised of 4 lines for interrupt request, power fail, halt and interval timer interrupt.

The data and address lines (DAL) are 32 bidirectional lines that are time-multiplexed. Toward the beginning of a read or write cycle, DAL [31:0] provide address and control information via DAL [31:30] to indicate the length of data to be transferred as follows:

| [31] | [30] | Length of Data |
| --- | --- | --- |
| 0 | 0 | Byte (8 bits) |
| 0 | 1 | Word (16 bits) |
| 1 | 0 | Longword (32 bits) |
| 1 | 1 | Quadword (64 bits) |

The processor chip 10 executes quadword transactions on the local bus 17 as two consecutive longword transactions and DAL [29:2] convey a physical longword address. Data is always transferred on naturally-aligned longword boundaries. Bit [29] distinguishes memory space from I/O space such that DAL[29]=0, for a memory reference, and DAL[29]=1 for an I/O reference.

DAL [1:0] are the byte address but may differ from the address implied by BM [3:0] during an instruction prefetch (always an aligned longword), during a character string data prefetch (always an aligned longword), during a PTE (page table entry) read (always an aligned longword) or during the second cycle of an unaligned operation.

Toward the end of a write cycle, DAL [31:0] transmit data from the bus master to the slave device. Toward the end of a read cycle, DAL [31:0] transmit data from the slave to the bus master.

DAL [31:0] are also used for interrupt acknowledge cycles, external processor cycles and external processor register cycles. For an Interrupt Acknowledge Cycle, toward the beginning of an interrupt acknowledge bus cycle, DAL [4:0] output the interrupt priority level (IPL) of the interrupt. Toward the end of the cycle, DAL [9:2] input the interrupt vector.

For an external processor register cycle, the processor chip 10 does not implement all the internal processor registers (IPRs) specified in the VAX architecture. These omitted IPRs are implemented externally and accessed through MTPR (Move to Processor Register) and MFPR (Move from Processor Register) commands. In the module 9 the console registers in the DLART chip are accessed as external processor registers. These bus cycles are similar to external processor cycles.

The Byte Mask signals specify which bytes on DAL [31:0] contain valid information during the data transfer part of a read or write cycle. When BM [3] is asserted, DAL [31:24] contain valid data. When BM [2] is asserted, DAL [23:16] contain valid data. When BM [1] is asserted, DAL [15:8] contain valid data and when BM [0] is asserted, DAL [7:0] contain valid data.

During a read cycle, the Byte Mask signals indicate which bytes the slave device must place on DAL [31:0]. The bus master ignores bytes that do not contain valid data. During a write cycle, the Byte Mask signals indicate which bytes on DAL [31:0] contain valid data. The slave device ignores the masked bytes. During unmasked reads and writes, and during interrupt acknowledge cycles, all four Byte Mask signals are asserted. The Byte Mask signals are valid only when the Address Strobe line (AS) is asserted.

The Write line (WR) specifies the direction of a data transfer on DAL [31:0]. If the bus master asserts WR, then it will drive data onto DAL [31:0]. If the bus master does not assert WR, then the slave device will drive data onto DAL [31:0]. WR is valid only when AS or EPS is asserted.

The Address Strobe line provides timing information for address transfers. The bus master asserts AS when the address on DAL [29:2] is valid during a read, write, or interrupt acknowledge cycle. The bus master deasserts AS at the end of the bus cycle.

The Data Buffer Enable line (DBE) in conjunction with WR, controls the DAL transceivers. The bus master asserts DBE to enable the transceivers and deasserts DBE to disable them.

The Data Strobe line (DS) provides timing information for data transfers. During a read cycle or an interrupt acknowledge cycle, the bus master asserts DS to indicate that it is ready to receive incoming data. The bus master then deasserts DS to indicate that it has received and latched the incoming data. During a write cycle, the bus master asserts DS to indicate that DAL [31:0] contain valid write data. The bus master then deasserts DS to indicate that it is about to remove the write data from DAL [31:0].

External logic asserts the Ready line (RDY) to indicate the normal termination of a read, write, or interrupt acknowledge cycle. During a read cycle, this indicates that the slave device will place the required data on DAL [31:0]. During a write cycle, this indicates that the slave device has received data on DAL [31:0]. During an interrupt acknowledge cycle, this indicates that the interrupt vector has been placed on DAL [31:0]. When the bus master recognizes an asserted RDY, it terminates the current bus cycle. External logic then deasserts RDY.

External logic asserts the Error line (ERR) to indicate the abnormal termination of a read, write, or interrupt acknowledge cycle. After receiving an asserted ERR, the bus master terminates the current bus cycle. External logic then deasserts ERR. On receiving an asserted ERR, the processor chip executes a machine check.

A response PAL 41 (see FIG. 4B) in the memory controller 12 asserts ERR whenever a parity error occurs on a read from local RAM 13, provided that parity error reporting is enabled.

The Cycle Status signals (CS), in conjunction with WR, provide status about the current bus cycle. When AS is asserted during a read, write, or interrupt acknowledge cycle, CS [2:0] are encoded as shown in Table 1.

External logic requests control of the local bus 17 by asserting the DMA Request (DMR) line. DMR must be asserted as long as external logic controls the bus. At the end of the DMA bus cycle, external logic deasserts DMR. In the module 9 the chip 16 is the only device that uses the local bus 17 for DMA transfers.

The processor chip 10 asserts the DMA Grant (DMG) line to give external logic control of the local bus 17. The processor 10 asserts DMG as long as external logic has control of the bus and deasserts DMG after external logic has deasserted DMR. In the module 9, the chip 16 is the only device that requests and is granted control of the local bus 17. DMG is also asserted during retry cycles.

The Interrupt Request signals are the device interrupts to the processor chip 10. External logic asserts IRQ[3:0] to post interrupt requests.

Each IRQ line has a unique interrupt priority level (IPL). The processor 10 accepts an interrupt request only if the request's IPL is higher than the IPL at which the processor 10 is currently operating. Each interrupt line also corresponds to a unique IPL on the system bus. An incoming system interrupt is translated by the chip into a corresponding local bus device interrupt.

The IPL assignments for IRQ [3:0] are: IRQ [3] is IPL 17 (hex); IRQ [2] is IPL 16 (hex); IRQ [1] is IPL 15 (hex); and IRQ [0] is IPL 14 (hex). IRQ [3:0] are level-sensitive signals that the processor chip 10 samples every cycle (200 ns). The processor 10 sychronizes an IRQ signal internally. When the processor 10 accepts an interrupt request, it completes the current macroinstruction and then executes an interrupt acknowledge bus cycle. During this cycle, the processor 10 acknowledges the IPL at which the IRQ is posted and then inputs the vector for the interrupt. In the module 9, the chip 16 inputs the acknowledged IPL and outputs the appropriate interrupt vector on DAL [9:2].

On the assertion of system AC LO L, indicating that the line voltage is below specification, the powerfail interrupt (BCI AC LO) is asserted to the processor 10. This interrupt vectors program control to a powerfail routine. When the module 9 asserts system DC LO L, indicating DC system voltages are about to fall below specification, the RESET line is asserted. RESET causes the module 9 to enter its initialized state by initializing the processor 10 and other logic on the local bus 17. Furthermore, asserting RESET aborts any local bus 17 operations and/or internal chip operations in progress.

When the module 9 is in program mode and the key switch is enabled, pressing the BREAK key on the console terminal keyboard asserts HALT to the processor 10, forcing the module 9 to enter console mode. After halting, the processor 10 executes an external processor write cycle. During this cycle, Cycle Status [1:0]=10 and DAL [5:0]=111111. The module 9 ignores this bus cycle.

HALT is a nonmaskable interrupt. HALT always interrupts the processor chip 10 after the current macroinstruction completes, regardless of the processor's 10 current IPL. HALT is an edge-triggered signal that is sampled every cycle (200 ns).

The interval counter overflows every 10 milliseconds, thereby generating an interval timer interrupt (INTTIM) to the processor 10 at IPL 16.

The interval counter is controlled by the Interval Clock Control Register (ICCR), an IPR in the processor 12. The counter is enabled when bit [6] in the ICCR is set and disabled when bit [6] is clear.

The module 9 supports different local bus 17 cycle types. The types include idle, read, write, interrupt acknowledge, DMA and retry.

During an idle cycle, DAL [31:0] are asserted but are undefined, and the bus control signals are deasserted. An idle cycle lasts four clock phases (nominally 200 ns).

In a CPU read cycle, the bus master inputs data from memory or an on-board I/O device. A CPU read cycle lasts at least eight clock phases (nominally 400 ns) and may last longer in increments of four clock phases (nominally 200 ns).

For a CPU read cycle, the bus master drives a physical longword address onto DAL [29:2]. The bus master asserts BM [3:0] as required and deasserts WR. The bus master asserts AS, indicating that the address is valid, and then asserts DS, indicating that DAL [31:0] are free to receive incoming data. If no error occurs, the slave device drives the required data onto DAL [31:0], and external logic asserts RDY. If an error occurs, external logic asserts ERR, which aborts the bus cycle. This causes the processor 10 to execute a machine check. Finally, the bus master deasserts AS and DS to end the cycle.

In a CPU write cycle, the bus master outputs data to memory or an on-board I/O device. A CPU write cycle lasts at least eight clock phases (nominally 400 ns) and may last longer in increments of four clock phases (nominally 200 ns).

For a CPU write cycle, the bus master drives a physical longword address onto DAL [29:2]. The bus master asserts BM [3:0] as required and asserts WR. The bus master asserts AS, indicating that the address is valid. The bus master then drives data onto DAL 31:0] and asserts DS, indicating that the data is valid on DAL [31:0]. If no error occurs, the slave device reads the data, and the external logic asserts RDY. If an error occurs, external logic asserts ERR, which aborts the bus cycle. This causes the processor 10 to execute a machine check. Finally, the bus master deasserts AS and DS to end the cycle.

In an interrupt acknowledge cycle, the processor chip 10 acknowledges a posted interrupt and inputs an interrupt vector. An interrupt acknowledge cycle lasts at least eight clock phases (nominally 400 ns) and may last longer in increments of four clock phases (nominally 200 ns). The detailed timing of an interrupt acknowledge cycle is identical to that of a CPU read cycle.

At the beginning of the cycle, the processor 10 outputs on DAL [4:0] the IPL of the interrupt being acknowledged. The processor 10 then asserts AS to indicate that DAL [4:0] contain a valid IPL. The chip 16 reads the IPL from the bus. The processor 10 then asserts DS to indicate that DAL [9:2] are free to receive the interrupt vector. The chip outputs the appropriate interrupt vector on DAL [9:2]. If an error occurs, external logic asserts ERR, which causes the processor 10 to ignore the data and abort the transaction. Finally, the processor chip 10 deasserts AS and DS to end the interrupt acknowledge bus cycle.

The processor 10 initiates the cycle by driving the cycle status onto CS [1:0], precharging and sustaining CS [2] high, and asserting EPS. The external processor responds by placing the required information on DAL [31:0]. The processor 10 reads the information on DAL [31:0] and deasserts EPS. The external processor then removes the information from DAL [31:0] to end the cycle.

In an external processor write/command cycle, the processor chip 10 outputs either a command or data to an external processor. The cycle lasts four clock phases (nominally 200 ns).

In a DMA cycle, the processor chip 10 relinquishes control of the local bus 17 to an on-board DMA device. The cycle begins when a DMA device (the chip) asserts DMR to request control of the bus. At the conclusion of the current bus cycle, the processor 10 tristates DAL [31:0], AS, DS, WR, and DBE; drives high and tristates BM [3:0] and CS [2:0], and asserts DMG. The DMA device may now use the bus to transfer data. On completion of the transfer, the DMA device stops driving AS, DBE, and DS and deasserts DMR. The processor 10 then deasserts DMG and begins the next bus cycle.

If a transaction request is not granted, the processor chip 10 retries the transaction. The local bus 17 address is stored in the chip.

The local bus 17 supplies eight hardware interrupts to the processor 10. Four of these interrupts are external and four are internal. External interrupts allow on-board devices to interrupt the processor 10. Internal interrupts alert the processor 10 to impending power failures, console halt requests, and interval timer overflows.

The Interrupt Request lines, IRQ[3:0], are the four external interrupts. IRQ [3:0] are assigned IPLs 17 through 14 (hex), respectively. The higher the IPL, the higher the interrupt priority. The processor 10 responds to an interrupt request when the request's IPL is higher than the IPL at which the processor 10 is currently operating.

The processor 10 responds to an external interrupt after completing the current macroinstruction by executing an interrupt acknowledge bus cycle. During this cycle, the processor 10 outputs the IPL of the interrupt on DAL [4:0], and then inputs the interrupt vector from the requesting device on DAL [9:2]. In the module 9, the chip inputs the IPL and outputs the appropriate vector for all interrupt acknowledge cycles.

The three external events which generate internal interrupts to the processor 10 are (1) pressing the BREAK key on the console terminal keyboard (if the halt-on-BREAK function is enabled), (2) a power failure and (3) an interval counter overflow. The following sections describe these events. Internal interrupts do not cause the processor 10 to execute an interrupt acknowledge bus cycle. Instead, program control is vectored to a routine appropriate to the type of internal interrupt.

When the module 9 is in program mode, pressing the BREAK key on the console terminal keyboard asserts HALT to the module 9, forcing the module 9 to enter console mode after completing the current macroinstruction. The halt-on-BREAK function can be disabled by setting the front panel key switch to the Secure position.

When the input line voltage goes below specification, the module 9 system control unit in the system asserts system AC LO L, which generates a powerfail interrupt to the processor 10 at IPL 1E. This interrupt vectors the processor 10 to a powerfail routine.

The interval counter overflows every 10 milliseconds, thereby generating an interval timer interrupt (INTTIM) to the processor 10 at IPL 16.

Interval timer interrupts are controlled by the Interval Clock Control Register (ICCR), an IPR in the processor 10. Setting bit [6] in the ICCR enables the interrupts. Clearing this bit disables the interrupts.

On-board peripheral devices request and are granted control of the local bus 17 through DMA Request (DMR) and DMA Grant (DMG), respectively. The chip uses DMAs to transfer data between the local memory 13 and the system bus 18.

The Error line on the local bus 17 alerts the bus master to an error condition during the current bus cycle. The memory controller 12 asserts ERR whenever a parity error occurs on a read from local RAM 13, provided that parity is enabled. This causes the processor 10 to perform a machine check.

The local bus 17 carries a 28-bit physical address on DAL[29:2] that can reference 1 Gbyte physical address space. The local bus address space is equally divided into I/O space and memory space. For I/O references, address bit [29] is cleared. All on-board peripheral devices and ROM 14 reside in local bus 17 I/O space. Local RAM 13 resides in local bus memory space.

System Bus Interface

The module 9 communicates with other system bus 18 nodes by interfacing the local bus 17 to the system bus 18. This interface lets the module 9 access I/O controllers, bus adapters, system memory modules, and other system processors.

Most of the logic that provides this interface to the system bus 18 is implemented by the chip 24 (bus interconnect interface chip), and the chip 16 (interface chip). Additional interface logic is provided by the node ID buffers and the Console Display/Control Register (CDCR).

On one side, the chip 24 connects directly to the system bus 18. On the other side of the chip 24 is the BCI bus, which is the standard user interface to the system bus 18. In fact, from the perspective of the module 9, the chip 24 appears to be the system bus. The BII chip also implements the system protocol and error checking.

The chip 16 interfaces the local bus 17 to the BCI bus 33. The BCI bus 33 is the user side of the chip 24. The chip 16 is thus the window on the system bus 18. The processor 10 sees the chip 16 as a memory-mapped peripheral device.

Whenever the module 9 processor issues a read or write to non-local memory space, a response PAL 41 (see FIG. 4) asserts system REFERENCE to the chip 16. The chip 16, aided by the chip 24, then translates the local bus 17 transaction into a system transaction.

Whenever the module 9 processor issues a read or write to non-local I/O space, the chip 16 automatically translates the transaction onto the system bus 18. The chip 16 reports the status of windowed transactions back to the processor 10.

In addition, the chip 16, aided by the chip 24, translates incoming system transactions into local bus 17 transactions. When the local bus 17 transaction completes, the chip 16 reports the transaction's completion status and, if appropriate, returns data to the originating system node.

If contention arises between an incoming system transaction and an outgoing local bus 17 transaction, the chip 16 asserts RETRY to a retry PAL 40 (see FIG. 4) in the memory controller 12. The retry PAL 40 then suspends the outgoing local bus 17 transaction until the incoming system transaction completes. The chip 16 stores the address for all local bus 17 transactions in its Retry Address Latch. When a suspended local bus 17 transaction is retried, the memory controller 12 fetches the stored local bus 17 address from the chip 16.

The chip 16 provides an interrupt controller for the processor chip 10. When the processor chip 10 acknowledges an interrupt from any source, the chip 16 inputs the acknowledged IPL (interrupt priority level) and supplies the processor 10 with the appropriate interrupt vector. In addition, the chip 16 translates system interrupts targeted at the module 9 processor into corresponding local bus 17 interrupts to the processor 10.

The chip 16 provides 14 general purpose registers (GPRs) in the node space. GPR 0, the Receive Console Data (RXCD) Register, is the console interface to the system bus 18. GpR 5, the permanent power-Up Diagnostic Register, stores a copy of the system self-test results. GPRs 7 through 11 are used by the console entry sequence. GPR 11, the Console Status Register, contains status on initialization. The rest of the chip 16 GPRs are not used.

The chip 16 implements two functions that the processor 10 does not use during normal operation but that may be useful for diagnostic purposes and special operations. The processor 10 can construct commands for the system bus 18 by writing certain chip 16 registers. The chip 16 also contains a special data mover that can move data over the system bus in octal word packets.

The Console Display/Control Register (CDCR) provides direct reads of several control lines on the system bus 18. The CDCR can also be written by the processor chip 10 to assert system RESET L and system BAD L on the system bus 18.

The system node identification number of module 9 is determined by four signal pins on the system backplane. This node ID number is independent of the slot location of module 9 in the system card cage. On power-up or reset, the node ID is loaded into the system Control and Status Register of the chip 24. The node ID determines which 8 Kbyte block in system nodespace is assigned to the module 9. This block contains the addresses of the system accessible registers. Blocks of nodespace are allocated according to the mapping scheme shown in FIG. 3.

The system bus 18 registers, which have addresses in system nodespace, are accessible to other system nodes.

System access to the local RAM is determined by the Starting Address and Ending Address Registers in the chip 24. These registers are loaded on power-up or reset by the primary processor in the system (which could be the module 9 itself). During normal operation, all of the local RAM 13 is accessible over the system bus 18.

Table 2 describes the implementation of the system commands by module 9. Since the processor 10 does not have cache memory, it does not issue read or write commands with the intention of caching data.

When referencing a nonlocal memory address, the memory controller 12 asserts system REFERENCE to the chip 16. The chip 16 then translates (windows) the local bus 17 transaction into a system transaction. Normally, the local bus 17 is unavailable for other transactions until the windowed system transaction completes. However, if the chip 16 receives an incoming system bus 18 transaction, it takes control of the local bus 17 to service the transaction and then restarts the interrupted local bus 17 transaction. If the system transaction completes successfully, the chip 16 asserts the Ready line. Otherwise, the chip 16 interrupts the processor 10 or, for serious errors, asserts the Error line.

Table 3 lists the translated local bus 17 transactions and their system counterparts. Table 4 indicates the conditions on the system bus 18 that cause the chip 16 to assert the Error line to the processor 10.

When the module 9 processor 10 is addressed over the system bus 18, the chip 16 asserts the DMA Request line (DMR) to the processor 10 to request mastership of the local bus 17. When granted bus mastership, the chip 16 translates the incoming system transaction into a local bus 17 transaction. The system bus 18 is interlocked during translated local bus 17 reads but not during translated local bus 17 writes. When the local bus 17 transaction completes, the chip 16 reports the completion status and, if appropriate, transfers data to the originating system node.

Table 5 lists the system transactions to which the module 9 responds and their local bus 17 translations. Table 6 indicates how the chip 16 translates local bus 17 status onto the system bus 18. Quadword and octaword transactions on the system bus 18 are translated into a series of longword transaction on the local bus 17.

The module 9 accepts both Interrupt (INTR) commands and Interprocessor Interrupt (IPINTR) commands from the system bus 18.

On receiving an INTR command, the chip 16 asserts the corresponding local bus 17 Interrupt Request (IRQ) line. System IPLs 7-4 correspond to local bus 17 interrupts IRQ [3:0], respectively. The processor chip 10 responds to the interrupt request by executing an interrupt acknowledge transaction, which the chip 16 windows onto the system bus 18 as an IDENT transaction. The chip 16 inputs the vector from the interrupting node and returns this vector to the processor chip 10.

On receiving an IPINTR, the chip 16 asserts IRQ [14] to the processor chip 10. When the processor chip 10 acknowledges the interrupt request, the chip 16 returns 80 (hex), the vector for all IPINTRs.

Memory Overview

Pursuant to an important feature of the present invention, the module 9 supports both local memory 13 (on-board dynamic RAM), expansion memory (off-board RAM) on memory array boards 15, which are daisy chained, and 128 Kbytes or 256 Kbytes of on-board ROM 14. The module 9 does not have cache memory.

In one embodiment, the module 9 has one Mbyte of on-board RAM 13, which is composed of 256 Kbit dynamic RAM chips. The local bus 17 master (processor 10 or chip 16) can access this memory only on naturally-aligned longword boundaries. However, the bus master can use the Byte Mask signals to specify which bytes in a transferred longword contain valid data.

On-board RAM 13 is parity protected. Byte parity is written to RAM on all writes and checked on all reads. Parity generation and checking is performed by the processor transceivers (for processor-initiated transactions) and by the chip 16 transceivers (for chip 16-initiated transactions). Parity is generated and checked only for bytes specified to be valid by the Byte Mask signals.

The memory access time depends on the local bus 17 master. A processor 10 initiated read cycle takes 400 ns, while a chip 16 initiated read cycle takes 50 to 100 ns longer, due to the synchronization requirements of chip 16. Write cycles are the same for both bus masters.

The system of the present invention can support a plurality of memory array boards 15 daisy chained to the memory array bus 21, as will appear. In the illustrated embodiments, because of physical constraints there is room for only five boards. Also in this embodiment each memory array board 15 contains two Mbytes of RAM. Each board is driven by its own on-board logic and by bus control signals.

An important feature of the present invention is that to the local bus 17 master, there is no distinction between on-board RAM and off-board RAM. Off-board RAM supports byte parity, masked reads and writes, and has the same access times as does on-board RAM.

Because of the daisy chaining, memory array boards 15 must be placed in slots adjacent to the board 9. There can be no intervening slots or boards between the memory array boards 15 and the board 9.

The main memory and the memory controller 12 support longword read, read interlock, longword write, masked longword write and unlock write mask memory cycle types. All memory bus cycles are on naturally-aligned longword boundaries.

A longword read is a simple read from memory. The read interlock bus cycle locks all of main memory so that another read interlock cannot access memory until the lock is cleared. However, noninterlocked types of read operations can still access memory. A read interlock sets the Memory Locked bit in the memory controller 12.

A longword write is a simple write to memory. In the masked longword write, certain bytes within the referenced longword may be masked out. The Byte Mask signals indicate which bytes are valid. The unlock write mask clears the lock on main memory set by a previous interlock read. An unlock write mask clears the Memory Locked bit in the memory controller 12.

According with the teachings of the present invention, on power-up or node reset, the initialization code sizes the local RAM 13 and makes the size available in chip 24 GPR 1. The module 9 then assigns a starting address offset (SAO) to the local RAM 13. The SAO is the base address of the local RAM 13 in system memory space. If the module 9 is a secondary processor, the SAO value is based upon the contents found in the chip 24 Starting Address Register (SADR).

The module 9 contains independent power connections for battery-backup voltages. When provided, battery backup maintains the local RAM 13 and refresh circuitry. Battery-backup voltage is monitored by the system control unit.

The standard 128 Kbyte ROM provides 32K longword locations at addresses 2004 0000 hex through 2004 5FFF hex. The optional 256 Kbyte ROM provides 64K longword locations at addresses 2004 0000 hex, through 2004 7FFF hex. Both ROM configurations are accessed on naturally-aligned longword boundaries.

The 128 Kbyte ROM 14 configuration has a 15-bit address (PA [16:2]). The 256 Kbyte ROM configuration uses the same 15 address bits plus the signal 256 Kbyte ROM as the 16th (high-order) address bit. When 128 Kbyte ROM 14 is present, the signal 256 Kbyte ROM is allowed to float, that is, the bit is not connected to the ROM chips and therefore can be neither high nor low. When the 256 Kbyte ROM is present, however, the signal 256 Kbyte ROM must be connected to the ROM chips by adding a jumper to the module. The jumper connects ROM address 17 coming from the processor physical address latch 28 with the 256 Kbyte ROM signal.

The standard 128 Kbyte ROM 14 provides 32K longword locations, but the total ROM space can accommodate 64K longwords. To completely fill the available boot ROM space, the 32K body of ROM code is replicated twice throughout this range of addresses.

Corresponding addresses from each set map to the same longword. This complete coverage of ROM space eliminates errors resulting from referencing nonexistent (unimplemented) locations. If a nonexistent location is referenced, the data returned is undefined.

The standard ROM configuration 14 contains the initialization routines, the primary bootstrap routine (VMB), diagnostic routines, and the console program, which are written in macrocode.

On power-up or node reset, program control jumps to the first location, 2004 0000 hex, in boot ROM space, and the module 9 executes its initialization routine. Note that the initialization code resides in the I/O space at addresses 2004 0000 hex, through 2008 0000 hex.

The primary bootstrap's main function is to locate the secondary bootstrap routine, bring it into memory, and then transfer control to it. The secondary bootstrap then loads the operating system.

The primary bootstrap also performs the following initialization in which it tests all of local memory and builds a bit map that flags physical memory pages (512 Kbytes each) as good or bad, finds out what devices are present and operative in the system, and sets up the restart parameter block (RPB), a data structure used by powerfail and recovery routines to save volatile processor states.

VMB contains a boot driver that loads the secondary bootstrap program into memory and also writes a dump file to disk if the operating system detects a fatal error.

The diagnostic code consists of a self-test, which runs automatically on power-up and reset, and additional diagnostics, which can be invoked from a console. The self-test provides a quick confidence check of the hardware at the node, including any attached memory array boards 15. The additional diagnostics test the module 9 more extensively. The diagnostic code also contains a parser that parses diagnostic commands.

The memory controller 12 controls access to the on-board memory, registers, and devices, as well as access to off-board memory that resides on attached memory array boards 15. Whenever the processor 10 or chip 16 references the physical address space, the memory controller 12 decodes the physical address and the local bus 17 cycle type, and provides completion status to the local bus 17 master. In addition the memory controller 12 controls the addressing of on-board RAM 13, refresh timing for both on-board and off-board RAM 15, parity error reporting and local bus retry timing.

Figure 4A:
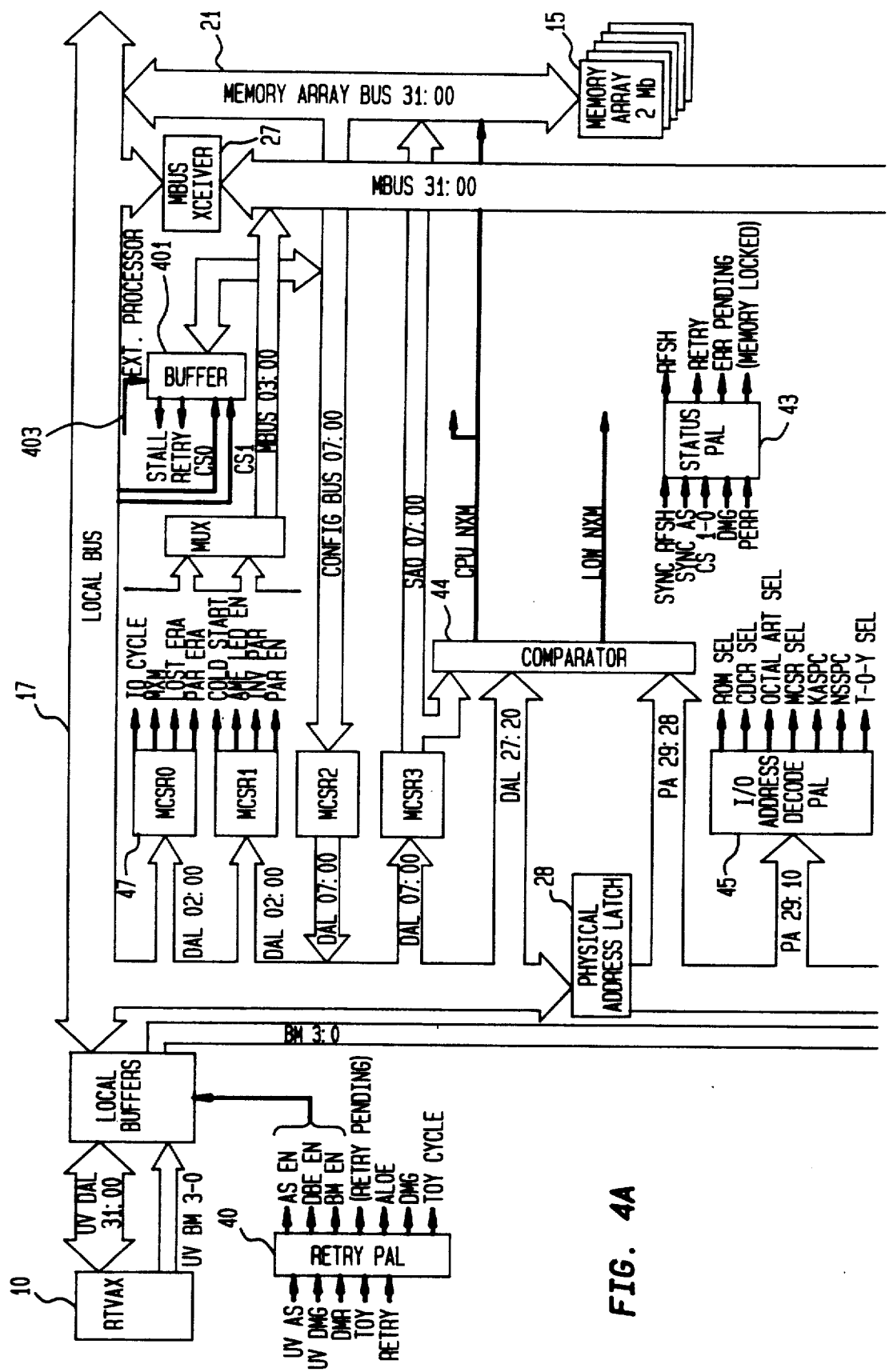
FIG. 4A and FIG. 4B are a block diagram of a memory controller for the memory of the system of FIG. 1.
Figure 4B:
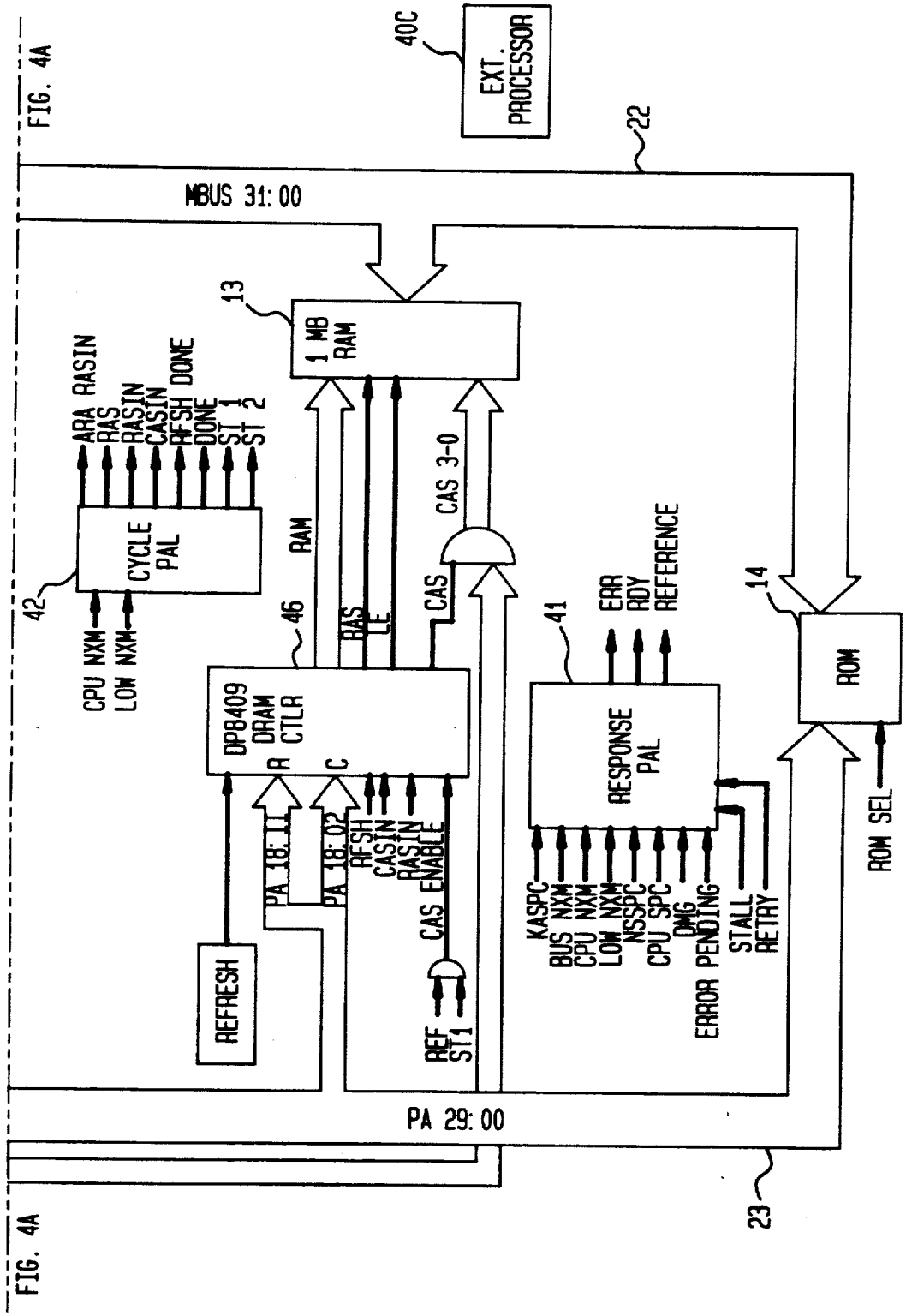

FIG. 4 is a block diagram showing the major components of the memory controller 12. These include I/O address PAL 45, memory address comparator 44, status PAL 43, cycle PAL 42, response PAL 41, retry PAL 40, DRAM controller chip 46, parity error logic and the memory control and status registers (MCSRs) 47.

The I/O address PAL 45 decodes all addresses on the physical address (PA) bus 23. The address can be memory address or an I/O address.

If the address is an implemented I/O address, the I/O address PAL 45 asserts KASPC (module 9 SPACE) to the response PAL 41, indicating that the address is implemented. The PAL 45 also selects or enables the referenced device which includes ROM 14, CDCR (Console Display/Control Register) PAL, Octal ART chip 26, MCSRs 47 (Memory Control and Status Registers) and TOY (time-of-year) clock 25. If the I/O reference is to an unimplemented I/O location (addresses 2008 5000 hex through 203F FFF hex), the address PAL 45 asserts NSSPC (Nonsupported Space) to the response PAL 41. The response PAL 41 then asserts RDY to the local bus 17 master, however, the data on DAL [31:0] is undefined.

Pursuant to the present invention, the memory address comparator 44 decodes all addresses on the physical address (PA) bus 23. The comparator 44 inputs PA [29:28] and compares address bits DAL [27:0] with the starting address offset (SAO [7:0]) for local RAM 13. The starting address offset specifies the local RAM's 13 base address in system memory space.

If PA [29] is set, the reference is to I/O space, otherwise, the reference is to memory space. If PA [28] is set, the reference is above the upper limit, OFFF FFFF hex, of the 256 Mbyte address range supported by the memory controller 12, and therefore cannot be implemented in the local RAM 13. If both pA [29] and PA [28] are clear, the comparator compares DAL [27:0] with SAO [7:0]. If DAL [27:0] is less than SAO [7:0], the referenced address is below the starting address offset, and therefore cannot be implemented in local RAM 13. If DAL [27:0] matches SAO [7:0], the referenced address is to on-board RAM 13. If DAL [27:0] is greater than SAO [7:0], the reference is not to on-board RAM 13 but may be to off-board RAM 15, that is, RAM on memory array boards 15.

According to the present invention, the comparator outputs two signals, CPU NXM (CPU Nonexistent Memory) and LOW NXM (Low Nonexistent Memory) to the cycle 42 and response 41 PALs. When neither signal is asserted, the memory reference is to on-board RAM 13. In this case the cycle PAL 42 asserts RASIN (Row Address Strobe In) to the DRAM controller 46. The DRAM controller 46 then latches the PA address and outputs the address and control strobes for on-board RAM 13. When CPU NXM is asserted, the memory reference is not to on-board RAM 13, but may be to off-board RAM 15 (RAM on the memory array bus 21). In this case, the attached memory array boards 15 take over the address decoding. If the reference is to one of these memory array boards 15, the selected board will respond to the bus cycle. Otherwise, the BUS NXM (Bus Nonexistent Memory) is asserted to the response PAL 41, causing the PAL 41 to assert system REFERENCE to the chip 16.

If the bus cycle was initiated by the processor chip 10, the chip 16 translates the transaction into a system transaction. If the bus cycle is an incoming system transaction, the chip 16 returns NO ACK on the system bus 18. When LOW NXM is asserted, the memory reference is not to local RAM 13. This causes the response PAL 41 to assert system REFERENCE to the chip 16. If the bus cycle was initiated by the processor chip 10, the chip 16 translates the transaction into a system transaction. If the bus cycle is an incoming system transaction, the response PAL 41 asserts ERR on the local bus 17 and the chip 16 returns NO ACK on the system bus.

The memory controller 12 provides status information to the local bus 17 master (processor 10 or chip 16) during a memory cycle. The bus master uses this status to control the cycle. The response logic for memory cycles is implemented in the status PAL 43 and the response PAL 41.

The status PAL 43 has an internal flip-flop called the Memory Locked bit. This flip-flop sets when an interlock read bus cycle locks the local memory 13. If another interlock read is attempted while the Memory Locked bit is set, the status PAL 43 asserts RETRY. The unlock write mask bus cycle clears the Memory Locked bit. Normally, the interlock read and unlock write mask bus cycles are a paired transaction and are generated by the same bus master.

The status PAL 43 also reports parity errors by asserting ERROR PENDING to the response PAL 41. If parity checking is enabled, the response PAL 41 then asserts ERR to the bus master to indicate abnormal termination of the bus cycle. ERROR PENDING remains asserted until cleared by a subsequent D-stream (data stream) read or write cycle.

If a bus cycle encounters no parity errors or is not restricted by a previous read lock, it may complete successfully. In this case the response PAL 41 asserts RDY to the bus master. If the processor chip 10 is the bus master, the response PAL 41 asserts RDY during the first response window in the cycle. This allows the processor 10 to execute a 400-ns (nominal) cycle. If the chip 16 is the bus master, the response PAL 41 asserts RDY when read data is valid on the local bus 17, which results in a long bus cycle of 500 ns (nominal). The chip 16 receives RDY early in the cycle for writes, which allows a minimum length bus cycle.

Table 7 describes the sequence of responses of memory controller 12 to any given event in a memory cycle. Table 8 describes the response.

A DP8409 DRAM controller 46 drives the on-board RAM 13. The DRAM controller 46 generates the address, row and column address strobes, and refresh count for the 256 Kbit DRAM chips.

The Column Address Strobe (CAS) from the DRAM controller 46 is divided into four CAS signals that are gated by BM [3:0]. When a Byte Mask line is asserted, the corresponding byte in the longword is to be read or written.

Memory access and refresh cycles are controlled externally to the DRAM controller 46. The control logic is implemented in the cycle PAL 42 and the status PAL 43.

The status PAL 43 uses the synchronized Address Stroke SYNC (AS) and Refresh (SYNC RFSH) signals to arbitrate between memory and refresh cycles. When there is contention (both signals assert on the same clock edge), the memory cycle wins. If Synchronized Refresh alone is asserted, the PAL asserts the Refresh line (RFSH) to initiate a refresh cycle.

The status PAL 43 allows memory refreshing while a windowed local bus 17 transaction is outstanding on the system bus 18. While waiting for the transaction to complete, the processor 10 asserts AS to interlock the local bus 17. Normally, this would prevent a refresh cycle from occurring. However, the status PAL 43 can detect this situation, and will allow refreshing even though AS is asserted.

The cycle PAL 42 controls the address timing for both on-board 13 and off-board RAM 15. When on-board RAM 13 is referenced, the PAL 42 asserts RASIN (Row Address Strobe In) and CASIN (Column Address Strobe In) to the DRAM controller. The DRAM controller 46 synchronizes these signals internally and outputs RAS (Row Address Strobe) and CAS (Column Address Strobe) to the RAM. When the memory cycle is a possible reference to off-board RAM 15 (CPU NXM asserted and LOW NXM deasserted), the cycle PAL 42 asserts ARR RASIN (Array Row Address Strobe In) on the memory array bus 21. ARR RASIN serves as the start pulse for off-board memory and refresh cycles.

Under certain conditions, the retry PAL 40 suspends and then restarts (retries) local bus 17 transactions initiated by the processor 10. For a detailed description of the retry sequence mechanism, reference should be made to co-pending application Ser. No. 496,097 entitled "Method and Apparatus for Suspending and Restarting A Bus Cycle" filed Mar. 3, 1990, which is a continuation of Ser. No. 93,188 filed Sep. 4, 1987 that is now abandoned.

Byte parity on the local bus 17 is generated for processor initiated transactions, by the processor transceivers 36, and for chip 16 initiated transactions, by the chip 16 transceivers. Parity is checked by the chip 16 transceivers 34. When the parity error signal is generated, the memory controller 12 generates two parity error reporting signals called PERR and PARITY ERROR.

Whenever a parity error is detected, PERR is asserted. This sets the Parity Error bit in the Memory Status Register 47 (MCSR0) when the cycle PAL 42 asserts DONE to indicate that the bus cycle has finished. The Parity Error bit is only a status bit. It does not cause the operating system to respond to the parity error.

PARITY ERROR is a logical AND of PERR and of the Parity Enable signal (PAR EN) from the Memory Control Register 47 (MCSR1). If the Parity Enable signal is asserted, PARITY ERROR is asserted whenever PERR is asserted to the status PAL 43. The status PAL 43 then asserts Error Pending to the response PAL 41. The response PAL 41 terminates the bus cycle by asserting ERR to the bus master.

The memory controller 12 has four control and status registers. The memory status register (MCSR0) reports parity errors and enables latching of the address at which a parity error occurs. The memory control register (MCSR1) parity reporting and indicates whether local memory was successfully sustained by battery backup when main system power was off. The memory configuration register (MCSR2) indicates the highest Mbyte boundary of the last memory array board 15 that was accessed. The memory starting address offset/error address register (MCSR3) on power-up or reset is written to by the primary processor's memory configuration routine. The routine writes the starting address offset (SAO) for local memory into this register. Under certain conditions, the register indicates the address of a memory location that was read with bad parity.

Memory Array Bus

The system of the present invention contains a memory array bus 21 which is an off-board extension of the local bus 17. The memory array bus 21 connects one or more memory array boards 15 to the local bus 17, thereby allowing the module 9 to access an expanded main memory.

The major differences between the memory array bus 21 and the local bus 17 are that the memory array bus 21 does not have DMA control lines, a device on the memory array bus therefore cannot conduct DMA operations. The memory array bus 21 has just one Interrupt Request line and memory array boards 15 do not use this line. The memory array bus 21 has refresh signals, bus control signals, and special select and configuration signals necessary for communication with memory array boards 15. The memory array bus 21 has control signals for the error LED on each memory array board 15. The memory array bus 21 supports only D-stream (data stream) read and write type bus 21 cycles. The memory array bus 21 therefore does not require Cycle Status signals to convey information about the bus cycle type, only a Write signal is needed.

Figure 5:
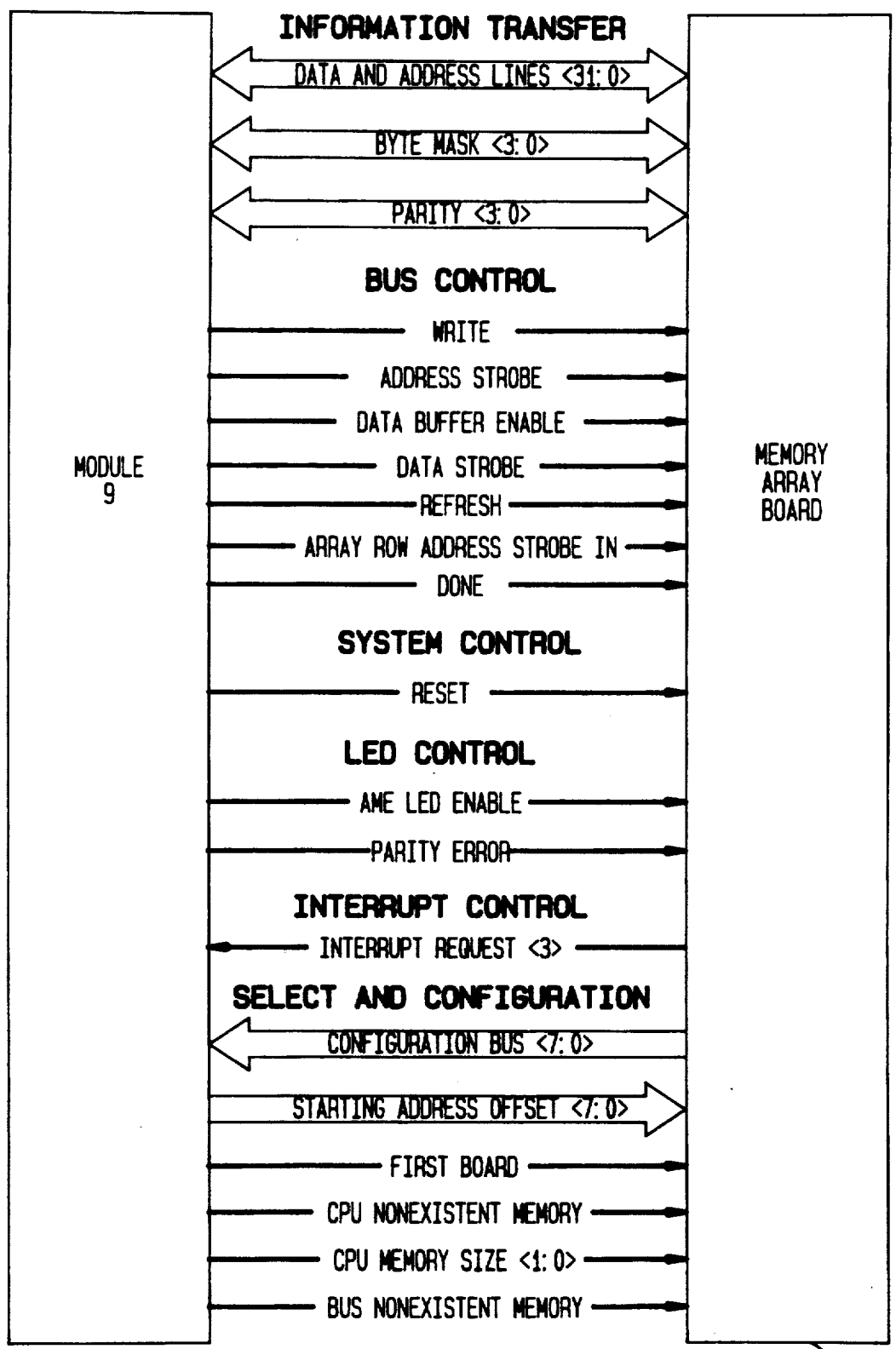
FIG. 5 is an illustration of the memory array bus structure of the memory of FIG. 4.

Refer to FIG. 5 for a delineation of the memory array bus signals. There are six types of signals supported by the memory array bus 21. Information transfer signals refer to 32 data and address lines, four byte mask lines and three parity lines. The bus control signals are Write (WR), Address Strobe (AS), Data Buffer Enable (DBE), Data Strobe (DS), Refresh (RFSH), Array Row Address Strobe in (ARR RASIN), and DONE. The system control signal is RESET. The LED control signals are AME LED enable and Parity Error (PAR ERR). The interrupt control signal is Interrupt Request [3]. The select and configuration signals are eight lines for the configuration bus, eight lines for starting address offset, first board, CPU nonexistent memory, two lines for CPU memory size and bus nonexistent memory.

The Data and Address Lines are 32 bidirectional lines that are time-multiplexed. During the first part of a read or write cycle, DAL [31:0] provide the address and control information as they do on the local bus 17. DAL [31:30] indicate the length of the data to be transferred in the same manner as done in the local bus 17.

DAL [29:2] indicate a physical longword address. Data is always transferred on longword boundaries. Bit [29] distinguishes memory space from I/O space as it does on the local bus 17. DAL [1:0] are the byte address. During the second part of a read or write cycle, DAL [31:0] carry the longword being transferred.

The byte mask, write, address strobe and data strobe signals perform the same functions on the memory array bus 21 as they did on the local bus 17.

The parity lines indicate byte parity during reads and writes. On writes, each Parity signal indicates the parity value to be written with the corresponding byte. On reads, each Parity signal indicates the parity value originally stored with the corresponding byte. Parity signals [3:0] correspond to DAL [31:0] as described above for the byte mask signals.

The Data Buffer Enable line, in conjunction with WR, controls the DAL transmitters and receivers on each of the memory array boards 15. The bus master asserts DBE to enable the devices and deasserts DBE to disable them.

The Refresh signal is the refresh strobe for off-board RAM on memory array boards 15. When the memory controller 12 asserts REF along with Array Row Address Strobe In (ARR RASIN), the RAM is refreshed if it is not being accessed by a memory cycle.

When asserted by the cycle PAL 42 in the memory controller 12, the Array Row Address Strobe In signal serves as the start pulse for memory cycles and refresh cycles to memory array boards 15.

When asserted by the cycle PAL 42 in the memory controller 12, the Done signal indicates that PAR [3:0] are valid and that a referenced memory array board 15 may now read valid parity from the bus.

RESET is a continuation of system DC LO L on the system bus 18. The system control unit in the system asserts system DC LO L when system DC voltages are about to fall below specification. When asserted, RESET gates off the Row Address Strobes and Bank Select signals on each of the memory array boards 15, thus disabling the boards.

When asserted, the AME LED Enable signal enables the error LED on each memory array board 15 attached to the bus. If a parity error occurs on a read from a memory array board 15, the LED on that board turns off. When deasserted, AME LED EN causes the error LED on a memory array board 15 to light if a memory location on that board is accessed. The latter function is used for diagnostic purposes. AME LED EN is output by the Memory Control Register (MCSR1) 47.

When asserted by logic in the memory controller 12, the Parity Error signal indicates that the module 9 detected a parity error on the current bus cycle. If bad parity is read from a memory array board 15, the error LED on the board turns off, provided that AME LED EN is also asserted.

The Interrupt Request signal is a device interrupt to the processor chip 10. If necessary, a device on the memory array bus 21 can use IRQ [3] to interrupt the processor 10. The memory array board 15 does not use this signal.

The aforementioned signals are provided in parallel to all memory over bus 21a which is an extension of bus 21. (See FIG. 6.)

Pursuant to an important feature of the present invention, the Configuration Bus signals are asserted by a memory array board 15 when it responds to a bus cycle. CONFIG BUS [7:0] represent the highest Mbyte boundary of the last reference memory array board 15 (the board's starting address offset plus the number of Mbytes on the board). CONFIG BUS [7:0] always represent an Mbyte value.

CONFIG BUS [7], when asserted, indicates that the device(s) attached to the memory array bus 21 should not be tested by the self-test diagnostic running on the module 9. When this bit is asserted the bus has been reconfigured to be an I/O bus as is described in detail in U.S. Pat. No. 4,933,845, issued Jun. 12, 1990, assigned to the same assignee as the present invention. CONFIG BUS [6] is asserted by the last memory array board 15 on the memory array bus 21 when it is selected to indicate last board. This information is used by the console software during memory sizing.

In the present invention, the Starting Address Offset signals from the Memory Starting Address Offset/Error Address Register (MCSR3) indicate the starting address offset assigned to the local memory 13. In the illustrated embodiment, these signals always represent a Mbyte value.

A significant feature of the present invention is that SAO [7:0] go to the first memory array board 15 attached to the memory array bus. The board adds the value of SAO [7:0] to the size of the on-board RAM 13 (e.g. 1 Mbyte) to calculate its own starting address offset.

The First Board signal is always asserted to the first memory array board 15 attached to the memory array bus 21. The signal indicates to the memory array board 15 that it is the first board attached to the bus and should add an amount equal to the size of memory 13 to SAO [7:0].

The CPU Nonexistent Memory signal is an address select signal to the first memory array board 15. When asserted, CPU NXM indicates that a memory reference is above the address range of the on-board RAM 13. The signal must be asserted for any memory array board 15 to respond to a memory bus cycle. The signal is generated by the memory controller 12.

The CPU Memory Size signals, which go to the first memory board 15 on the memory array bus 21, indicate the size of the on-board RAM 13 in Mbytes. In the illustrated embodiment, when cleared, the memory size is 1 Mbyte.

The Bus Nonexistent Memory signal is normally high and pulled low by any of the memory array boards 15 on the memory array bus 21 to indicate that the referenced address is on one of the attached memory array boards. The signal goes to the response PAL 41 in the memory controller 12.

Memory Array Board

Memory array boards 15, each of which provides 2 Mbytes of dynamic RAM (random access memory) in the illustrated embodiment, are used to expand the on board memory 13. In the illustrated configuration, up to five memory array boards 15 can be daisy chained to the memory bus 21 to provide a total of 10 Mbytes of expansion RAM. This limit is imposed because only five slots are available and is not a constraint of the present invention. The term, "daisy chain", as used in the system of the invention, implies a method of sequentially connecting certain select logic for a series of memory boards such that the output connection of memory board #1 is the input connection of memory board #2, and the output connection of memory board #2 is the input connection of memory board #3. This method of connecting the output of one memory board to the input of the next memory board is repeated to accommodate all of the memory boards present in the invention.

To the bus master (processor 10 or chip 16), there is no distinction between memory array 15 and the on-board RAM 13. Both memories store byte parity, support masked writes, and have identical access times (400 ns for processor-initiated transactions, and 50 to 100 ns longer for chip 16-initiated transactions).

Figure 6:
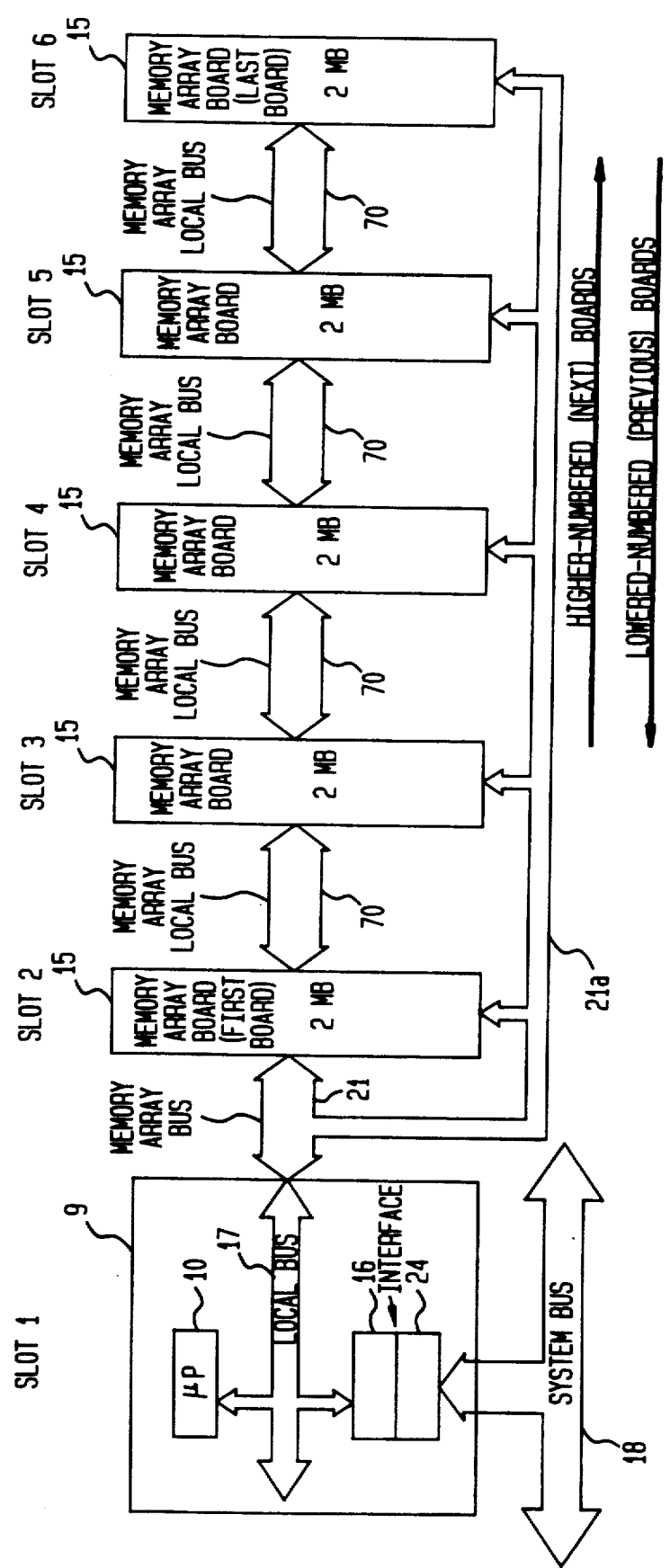
FIG. 6 is an illustration of a sample configuration of the memory according to the present invention.

The memory array board 15 supports longword read, longword write, masked longword write and refresh bus cycles. In the illustrated implementation, the memory array boards 15 must be located in card cage slots that are adjacent to and have higher numbers than the slot of processor board 9. There must be no empty slots in the sequence, and any boards after an empty-slot would not be connected to the bus due to the daisy chained wiring. FIG. 6 is illustrative of a sample configuration of the system of the present invention.

In one embodiment, the memory array board 15 contains 72 256 Kbit dynamic RAM chips, which are equally divided into two banks of 1024 rows and 1024 columns each. The board also has two identical error LEDs that indicate parity errors during normal operation and, on power-up, whether the board passed its self-test.

Figure 7:
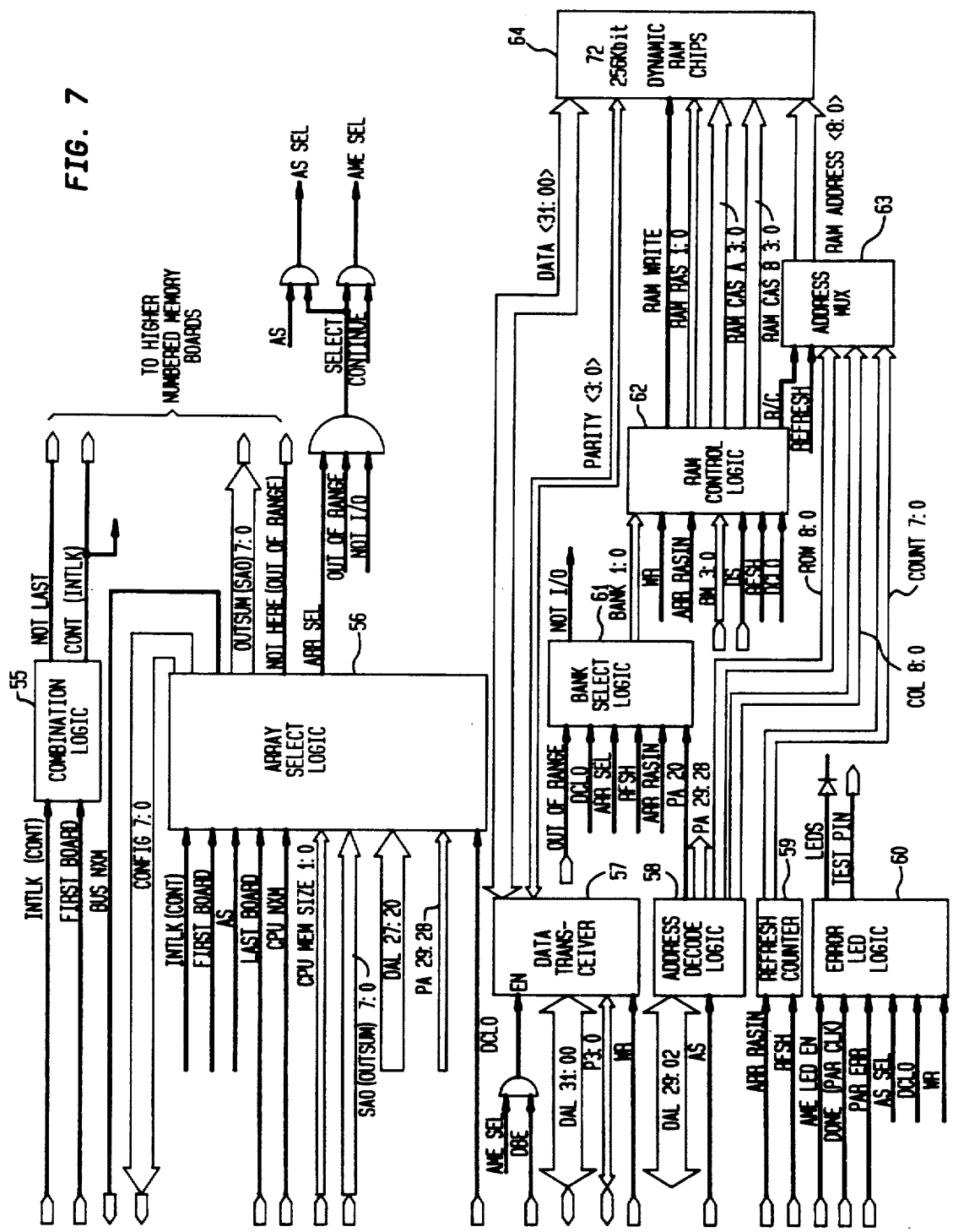
FIG. 7 is a block diagram of a memory array board used in the present invention.

Referring now to FIG. 7, there is illustrated, in block diagram form, the memory array board 15. The array includes array select logic 56, address decode logic 58, bank select logic 61, RAM control logic 62, address multiplexer 63, refresh counter 59, RAM configuration 64, data transceivers 57 and LED control logic 60.

The array select logic 56 has two main functions. First, it inputs and outputs RAM configuration information. Second, it determines whether the memory array board 15 is selected for a transaction.

An important feature of the invention is that, if the board is the first memory array board 15 on the memory array bus 21, the array select logic 56 inputs the starting address offset (SAO[7:0]) and CPU memory size from the module 9. The array select logic 56 adds these two parameters to the memory size of its own board e.g. 2 Mbytes to produce OUTSUM [7:0], which represents the upper limit of the board's address range. Since OUTSUM [7:0] correspond to bits [27:20] of the system physical address, they represent a Mbyte boundary. For example, if the SAO equals 7, the array select logic adds 7, 1, and 2 to arrive at an outsum of 10, which represents an upper limit of 0A00 0000 hex on the system bus 18.

If the board is not the first memory array board 15 on the bus 21, the array select logic 56 calculates its outsum by adding 2 (the number of on-board Mbtyes) to the outsum of the previous board. For example, if the previous board's outsum is 10, the array select logic 56 produces an outsum of 12, which represents an upper limit of 0C00 0000 hex, on the system bus 18.

Whenever a memory array board 15 is read, the array select logic 56 outputs the six low-order bits of its outsum as CONFIG [5:0] to the Memory Configuration Register (MCSR2) 47 in the memory controller 12. If the board is the last board, it also asserts LAST BOARD, which is CONFIG [6]. This information is used by the Sizing Local Memory routine.

The array select logic 56 selects the board for a transaction only if the following conditions are satisfied. Physical Address (PA) bits [29:28], which correspond to DAL [29:28] on the memory array bus 21, must both be cleared. If PA [29] is set, the reference is to I/O space, not memory space. If PA[28] is set, the referenced address is above the 256 Mbyte limit supported by memory controller 12. The referenced address must be below the upper limit of the board's address range. In other words, bits [27:20] of the address must be less than or equal to the board's outsum. The referenced address must be above the upper limit of all prior memory on the bus. If the board is the first board, the processor module 9 asserts CPU NXM, indicating that the reference is above its on-board memory. If the board is not the first board, the previous memory array board 15 asserts OUT OF RANGE, indicating that the reference is above its highest Mbyte boundary. These are the signals which must be daisy chained in accordance with the present invention.

When the board is selected for a transaction, the array select logic 56 asserts Array Select (ARA SEL), which is further conditioned into AME Select. When AME Select and Data Buffer Enable (DBE) are both asserted, the board's data transceivers 57 are enabled, allowing the board to either receive data from the bus 21 or drive data onto the bus 21. In addition, the selected board pulls BUS NXM which indicates that the referenced address is in memory array boards 15.

If the referenced address is above the board's upper limit, it asserts NOT HERE, which is OUT OF RANGE to the next higher memory array board 15. This indicates that the referenced address is not in lower memory.

In the array selection timing the bus master (processor 10 or chip 16) places the physical memory address onto DAL [31:0]. The bus master asserts AS (Address Strobe) to indicate that a valid address is on the bus. Each memory array board 15 whose address range is below the address asserts NOT HERE. OUT OF RANGE (NOT HERE from the previous memory array board 15) is asserted. If the referenced address is above the address range of all the memory array boards 15, BUS NXM remains asserted. This means that the referenced address is not on the module 9 or on any of the memory array boards 15. If a memory array board 15 is selected for the memory reference, that board asserts Select. The selected memory array board 15 outputs CONFIG [6:0] to memory controller 12.

The address decode logic 58 decodes DAL [29:2] on the memory array bus 21 during the address portion of the bus cycle (AS asserted). The logic outputs the row and column addresses (ROW [8:0] and COL [8:0] to the address multiplexer 63, the two high-order address bits (PA [29:28] to the array select logic 56 and the Bank Select bit (PA [20]) to the bank select logic 61.

When the memory array board 15 is selected for a transaction, or during a refresh cycle, the bank select logic 61 asserts either of two bank select strobes (BANK [1:0]) to the RAM control logic 62. The strobe is synchronized with the processor timing by ARR RASIN (Array Row Address Strobe In).

The state of PA [20], the select input to the bank select logic 61, determines which bank is selected. When PA [20] is asserted, the bank select logic 61 asserts BANK 1. When PA [20] is deasserted, the bank select logic 61 asserts BANK 0.

The RAM control logic 62 generates RAM WRITE, RAM RAS [1:0] (RAM Row Address Strobe) and RAM CAS A [3:0] and RAM CAS B [3:0] (RAM Column Address Strobe). RAM WRITE indicates the direction of the data transfer. When RAM WRITE is asserted, data is written to RAM. When RAM WRITE is deasserted, data is read from RAM. RAM RAS 1 is the address strobe for RAM bank 1. RAM RAS 0 is the address strobe for RAM bank 0. Both strobes are asserted during a RAM refresh.

RAM CAS A [3:0] are the column address strobes for RAM bank 0. RAM CAS B [3:0] are the column address strobes for RAM bank 1. The column address strobes are gated by the Bank Select strobe and Byte Mask signals (BMASK [3:0]). During a write an asserted BMASK signal gates the corresponding column address strobe through to the RAM chips, allowing the corresponding byte on the bus to be written. During a read operation, all the column address strobes are gated through. The memory array board 15 thus always outputs a full longword on reads. During a refresh cycle the column address strobes are gated off. The RAM control logic 62 also outputs the ROW/COLUMN (R/C) select signal to the address multiplexer.

The address multiplexer 63 selects the row address, column address, or refresh count for input to the RAM chips. The select signals for the multiplexer 63 are REFRESH and ROW/COLUMN (R/C).

The refresh counter 59 is driven by REFRESH CLOCK, an internal clock generated from RFSH and ARR RASIN. When REFRESH CLOCK is asserted, the refresh counter 59 outputs the refresh count (COUNT [7:0]) to the address multiplexer 63, which outputs the refresh count to the RAM chips 64.

In the illustrated embodiment, the RAM configuration 64 consists of 72 256 Kbit dynamic RAM chips equally divided into two banks. Each bank consists of 1024 columns and 1024 rows. Each unique row address (RAS plus ROW [8:0]) references a unique longword with its four associated parity bits. Each unique column address (CAS plus COL [8:0]) accesses a unique byte and the byte's associated parity bit.

When WRITE is asserted, the data transceivers receive data (DAL [31:0]) and parity bits (P [3:0]) from the memory array bus. When WRITE is deasserted, the transceivers drive data and stored parity bits onto the bus. The transceivers are enabled only when the board is selected for a transaction (AME Select asserted) and when Data Buffer Enable (DBE) is asserted.

The LED control logic 60 controls the two self-test LEDs on the board. When a parity error occurs on a read from the board, the memory controller asserts the Parity Error line (PAR ERR). PAR ERR is gated with a Parity Clock (PAR CLK), which is a continuation of DONE from the module 9.

On power-up or reset, the LEDs are off. If the memory array 15 passes self-test, the module 9 accesses the board and asserts AME LED EN (Set Parity) to turn on the LEDs. Otherwise, the LEDs remain off. Whenever the board is read, the LED control logic 60 samples PAR ERR when PAR CLK is asserted. If PAR ERR is asserted, indicating a parity error, the LED control logic 60 turns off the LEDs.

The LED control logic 60 also provides a TTL (transistor-transistor logic) test point, TEST PIN, which reflects the state of the LEDs. When the LEDs are on, TEST PIN outputs a 1. When the LEDs are off, the pin outputs a 0. This function is only for testing stand-alone boards.

Memory Array Local Bus

Pursuant to an important feature of the present invention, the memory array local bus 70 is a daisy chain that connects memory array boards 15 with each other as shown in FIG. 6. Essentially, the memory array local bus 70 is a continuation of a part of the memory array bus 21 (see FIG. 8). The two buses differ only in their configuration and select signals. The memory array local bus 70 provides certain signals required only between memory array boards 15 (OUTSUM [7:0], NOT HERE, OUT OF RANGE, CONTINUE, INTERLOCK, NOT LAST). The other part of the memory array bus, i.e., those lines which can be provided in common to all memory boards are continued on bus 21a. The memory array bus 21 also contains certain configuration information required only by the first memory array board 15 (FIRST BOARD, CPU NXM, CPU MEM SIZE).

Figure 8:
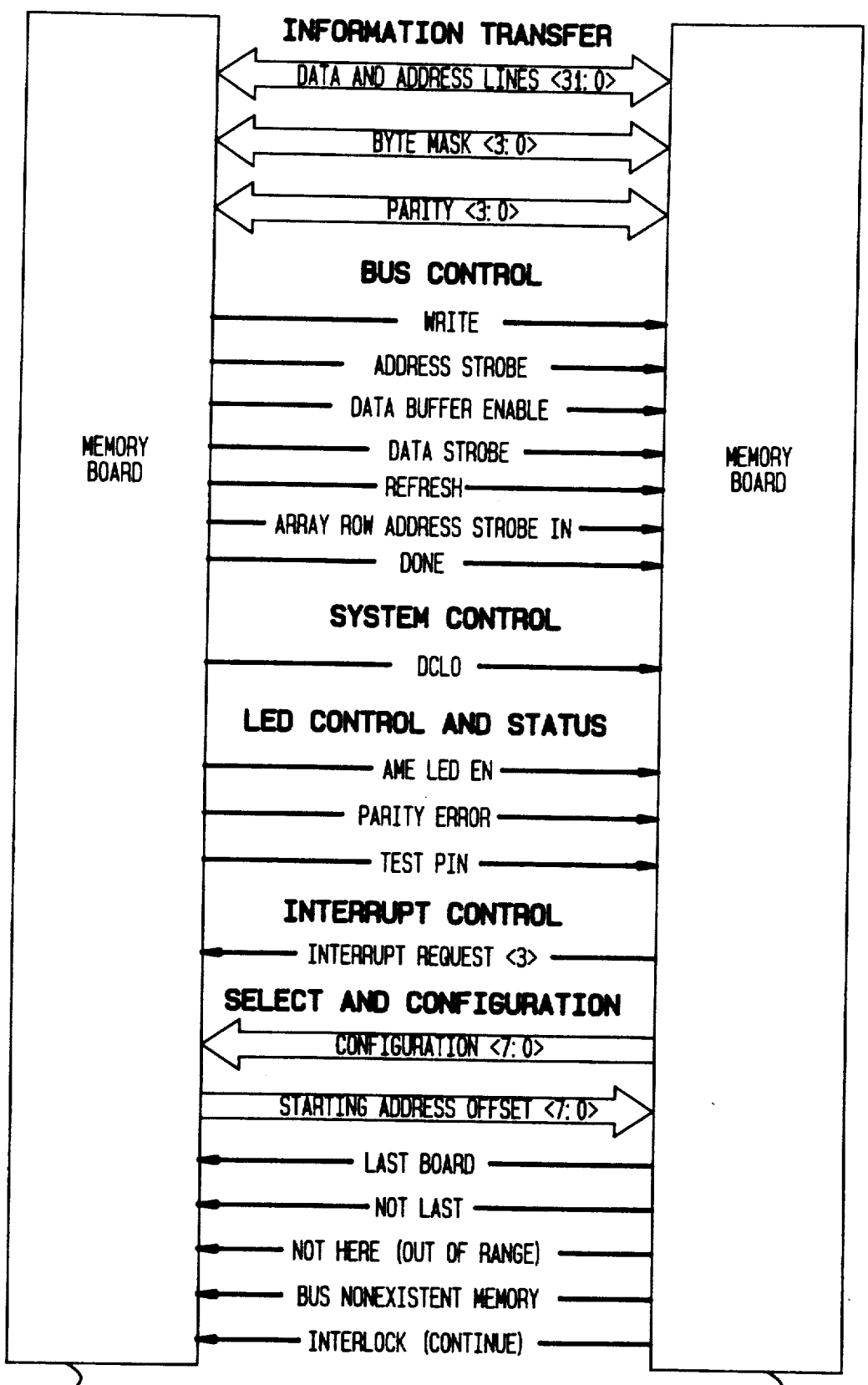
FIG. 8 is an illustration of a memory array local bus structure according to the present invention.

The memory array local bus signals on bus 21a and 70 are divided into six groups which are information transfer, bus control, system control, LED control and status, interrupt control and select and configuration. Referring to FIG. 8, which is a diagram of the memory array local bus structure, the information transfer signals are comprised of 32 data and address lines, four byte mask lines and 4 parity Write (WR), Address Strobe (AS), Data Buffer Enable (DBE), Data Strobe (DS), Refresh (RFSH), Array Row Address Strobe In (ARR RASIN), II write, II address strobe, II data buffer enable, II data strobe, refresh, array row address strobe in and DONE. The system control signal is DCLO. The LED control and status signals are AME LED EN, parity error and test pin. The interrupt control signal is interrupt request [3]. All of these signals are on bus 21a. Lastly, the select and configuration signals are comprised of eight configuration lines, eight lines for starting address offset, last board, not last, not here (out of range), bus nonexistent memory and interlock (continue). These are on bus 70.

The Data and Address Lines on the memory array local bus 21a perform the same functions as they do on the memory array bus 21 with the following exceptions. DAL [28], if set, indicates that the referenced address is above the address range supported by the memory controller 12. DAL [1:0] are undefined on the memory array local bus 21a.

The Byte Mask signal, write, address strobe, data buffer enable and data strobe lines all perform the same functions that they do on the memory array bus 21.

The Parity lines indicate byte parity during reads and writes. On writes, each Parity signal indicates the parity value to be written with the corresponding byte. On reads, each Parity signal indicates the parity value originally stored with the corresponding byte. The parity lines are encoded in the same manner as described in the memory array bus 21 portion of this application.

The status PAL 43 in memory controller 12 asserts RFSH to refresh a row of RAM locations. If there is contention between a refresh and address cycle, the address cycle is performed.

The cycle PAL 42 in the memory controller asserts ARR RASIN to provide a start pulse for memory cycles and refresh cycles to memory array boards 15. The signal marks the beginning of a memory or refresh cycle.

The cycle PAL 42 in the memory controller asserts DONE to indicate that P [3:0] are valid and that a referenced memory array board 15 may read valid parity from the bus.

The DCLO signal is a continuation of system DC LO L on the system bus 18. The system control unit in the system asserts system DC LO L when system DC voltages are about to fall below specification. When asserted, DCLO gates off the Row Address Strobes and Bank Select signals on each of the memory array boards 15, thus disabling the boards.

If a memory array board 15 passes its power-up self-test, the module 9 assesses the board and asserts the AME LED EN to turn on the board's LEDs. Otherwise, the LEDs remain off. AME LED EN originates in the Memory Control Register (MCSR1) 47 in the memory controller 12.

When a memory array board is read, its LED control logic 60 samples the Parity Error signal when DONE (PAR CLK) is asserted. If a parity error occurs, the module 9 asserts PAR ERR, causing the LED control logic 60 to turn off the board's LEDs.

The Test Pin signal is a TTL (transistor-transistor logic) test point that reflects the state of the LEDs. When the LEDs are on, TEST PIN outputs a 1. When the LEDs are off, the pin outputs a 0.

The Interrupt Request signal is a device interrupt to the processor chip 10. If necessary, a device on the bus can assert IRQ [3] to interrupt the processor 10. The memory array board 15 does not use this signal.

Pursuant to the invention, the Configuration signals are output by a memory array board 15 whenever the board is referenced. These bits are stored by the Memory Configuration Register (MCSR2) 47 in the memory controller 12 and used by the memory sizing routine.

CONFIG [5:0] represent the highest Mbyte boundary of the last referenced memory array board 15 (the board's starting address offset plus the number of Mbytes on the board). CONFIG [5:0] always represent an Mbyte value.

CONFIG [6] reflects the state of LAST BOARD. If the referenced memory array board 15 is the last board, it asserts LAST BOARD on a read, thus setting CONFIG [6]. Otherwise, the accessed memory array board 15 does not assert LAST BOARD, thus clearing CONFIG [6].

When jumpered to the asserted state, CONFIG [7] indicates that the device(s) attached to the memory array bus 21 should not be tested by the self-test diagnostic running on module 9.

An important feature of the present invention is if the memory array board 15 is the first board, SAO [7:0] represent the starting address offset from the module 9. To this offset, the first board adds the memory size of the memory 13 and its own memory size to produce an outsum. The outsum is the upper limit of the first board's address range and represents the upper address range of local memory thus far on the bus.

If the memory array board 15 is not the first board, it has as an input the outsum of the previous board as bits SAO [7:0]. In this case, SAO [7:0] represent the starting address offset for that board. The board adds SAO [7:0] to its own memory size (2 Mbytes) and outputs the resulting outsum to the next memory array board 15. The next board receives the outsum as SAO [7:0].

OUTSUM [7:0] represent the upper limit of address range of a memory array board 15. Since the outsum is an integral number of Mbytes, this limit is always on an Mbyte boundary. The outsum is used in two ways. First, it serves as the starting address offset for the next higher memory array board 15. Second, whenever a memory array board 15 is referenced, it sends its outsum as CONFIG [5:0] to the memory controller 12.

When the last memory array board 15 on the bus is referenced, that board asserts LAST BOARD, which is read by the module 9 as CONFIG [6]. The memory sizing routine reads this bit to determine whether the configuration information in the Memory Configuration Register (MCSR3) 47 is from the last board.

If the memory array board 15 accessed is not the last board on the bus, its LAST BOARD signal is deasserted by the next higher memory array board 15. Therefore, only the last board is able to assert LAST BOARD.

A memory array board 15 asserts NOT LAST to deassert the previous board's LAST BOARD signal. The last board does not assert NOT LAST and therefore is able to assert LAST BOARD.

When the address on the memory array local bus 21a is greater than the outsum of a memory array board 15

(the upper limit of the board's address range), the board 15 asserts NOT HERE to the next higher board 15. The next higher board 15 inputs this signal as the OUT OF RANGE signal.

If a memory reference directed at module 9 is above the address range supported by the memory array boards 15, BUS NXM is asserted to memory controller 12. This indicates that the referenced address is not in the local memory of module 9.

Each memory array board 15 asserts CONTINUE (CONT) to logically connect the next memory array 15 to the memory array bus 21. INTERLOCK (INTLK) is CONTINUE from the previous memory array board 15.

On power-up and node reset, the self-test running on module 9 tests each memory array board 15. When a memory array board 15 passes self-test its two self-test LEDs turn on. Otherwise, the LEDs remain off. The self-test tests just the data path circuitry on the memory array boards 15 by accessing the first longword on each Mbyte boundary. Self-test does not test individual memory cells.

The memory array board 15 stores a parity bit for each data byte. The parity bits are generated and checked by bus transceivers in module 9. If a parity error occurs on a read from a memory board, memory controller 12 asserts PAR ERR to turn off the two error LEDs on the board, provided AME LED EN is asserted. The LEDs turn on again if the board passes self-test after being reset.

When input line voltage falls below specification, the system control unit asserts system DC LO L. When asserted, system DC LO L (as DCLO) gates off the Bank Select signals and Row Address Strobes on the memory array boards 15, thus preventing the boards from reading or writing corrupted data.

What is claimed is:

1. A method for determining at predetermined times initializing addresses for a total memory space of a system, the system having a plurality of elements, with each element having a first portion that includes at least a central processing unit ("CPU"), a local memory which has a first variable address space size that is connected to the CPU, a memory controller, and an interface for connecting to other system elements, a second portion that includes at least a memory containing means that has a memory which has a second variable address space size, and a bus connecting the CPU and the memory containing means, the method comprising the steps of:
 (a) determining if the CPU of an element is the primary CPU of the system;
 (b) retrieving an address, which serves as a baseline starting address for the element memory space and serves as a basis from which a starting address for memory of the memory containing means in the second portion is determined, from a first storage means if the CPU of the element is other than the primary CPU of the system, and from a second storage means if the CPU of the element is the primary CPU of the system;
 (c) calculating the starting address for memory of the memory containing means comprising the substeps of,
  (1) transmitting the address retrieved at step (b) over the bus from the first or second storage means to the memory containing means and in the memory containing means assigning the address retrieved at step (b) as the starting address of the local memory,
  (2) transmitting the first variable address space size of the local memory over the bus to the memory containing means, and
  (3) determining in the memory containing means the starting address for memory of such memory containing means by adding the first variable address space size of the local memory to the starting address transmitted and assigned at substep (c) (1); and
 d) repeating steps (a) through (c) for each of the plurality of elements.

2. The method as recited in claim 1, wherein the method further includes the step of calculating in the memory containing means of each of the plurality of elements an ending address of memory of the memory containing means by adding the second variable address space size of such memory of the memory containing means to the starting address for memory of the memory containing means determined at substep (c) (3).

3. A method for determining at predetermined times initializing addresses for a total memory space of a system, the system having a plurality of elements, with each element having a first portion that includes at least a central processing unit ("CPU"), a local memory which has a first variable address space size that is connected to the CPU, a memory controller, and an interface for connecting to other system elements, a second portion that includes at least N memory containing means with memory of each of the N memory containing means having a variable address space size, where N >0, and a bus connecting the CPU with each of the N memory containing means and connecting each of the N memory containing means with each other, the method comprising the steps of:
 (a) determining if the CPU of an element is the primary CPU of the system;
 (b) retrieving an address, which serves as a baseline starting address for the element memory space and serves as a basis from which a starting address for memory for a first memory containing means of the second portion is determined, from a first storage means if the CPU of the element is other than the primary CPU of the system, and from a second storage means if the CPU of the element is the primary CPU of the system;
 (c) calculating a starting address and an ending address for memory of the first memory containing means comprising the substeps of,
  (1) transmitting the address retrieved at step (b) over the bus from the first or second storage means to the first memory containing means and in the first memory containing means assigning the address retrieved at step (b) as the starting address for the local memory,
  (2) transmitting the first variable address space size of the local memory over the bus to the first memory containing means,
  (3) determining in the first memory containing means the starting address for memory of such first memory containing means by adding the first variable address space size of the local memory to the starting address transmitted and assigned at substep (c) (1) of this step, and
  (4) determining in the first memory containing means the ending address for memory of the first memory containing means by adding a variable address space size of memory of the first memory containing means to the starting address for memory of the first memory containing means determined at substep (c) (3) of this step;

(d) calculating a starting address and an ending address for memory of a second memory containing means comprising the substeps of,
   (1) transmitting the ending address for memory of the first memory containing means determined at substep (c) (4) over the bus from the first memory containing means to the second memory containing means and in the second memory containing means assigning such ending address as the starting address for the memory of the second memory containing means, and
   (2) determining in the second memory containing means the ending address for memory of such second memory containing means by adding a variable address space size of memory of the second memory containing means to the starting address of memory of the second memory containing means transmitted and assigned at substep (d) (1) of this step;

(e) calculating a starting address and an ending address of the memory of each of a third to a Nth memory containing means comprising the substeps of,
   (1) transmitting separately the ending address for the memory for each of the second to the Nth-1 memory containing means over the bus from the second to the Nth-1 memory containing means respectively to a third to a Nth memory containing means, and in the third to the Nth memory containing means assigning the respective ending addresses of the second to the Nth-1 memory containing means as the starting addresses for memory of the third to the Nth memory containing means, respectively, and
   (2) determining in the third to the Nth memory containing means the ending address for memory of such third to the Nth memory containing means by adding a variable address space size of memory of the third to the Nth memory containing means to the starting address for memory of the third to the Nth memory containing means, respectively, transmitted and assigned at substep (e) (1) of this step; and f) repeating steps (a) through (e) for each of the plurality of elements.

4. A method of determining if an address is located in a total memory space of a system, the system having a plurality of elements, with each element having a first portion that includes at least a central processing unit ("CPU"), a local memory which has a first variable address space size that is connected to the CPU, a memory controller, and an interface for connecting to other system elements, a second portion that includes at least N memory containing means with memory of each of the N memory containing means having a variable address space size, where N>0, and a bus connecting the CPU with each of the N memory containing means and connecting each of the N memory containing means with each other, the method comprising the steps of:

(A) placing an address generated by a system CPU on the bus;

(B) comparing, in each of the plurality of elements, the address on the bus with an ending address of the local memory and each memory of the N memory containing means determined by the following substeps,
   (1) determining if the CPU of an element is the primary CPU of the system,
   (2) retrieving an address, which serves as a baseline starting address for the element memory space and serves as a basis from which a starting address for memory of a first memory containing means of the second portion is determined, from a first storage means if the CPU of the element is other than the primary CPU of the system, and from a second storage means if the CPU of the element is the primary CPU of the system,
   (3) calculating a starting address and an ending address for memory of the first memory containing means comprising the sub-substeps of,
      (a) transmitting the address retrieved at substep (B) (2) over the bus from the first or second storage means to the first memory containing means and in the first memory containing means assigning the address retrieved at substep (B) (2) as the starting address for the local memory,
      (b) transmitting the first variable address space size of the local memory over the bus to the first memory containing means,
      (c) determining in the first memory containing means the starting address for memory of such first memory containing means by adding the first variable address space size of the local memory to the starting address transmitted and assigned at sub-substep (a) of this substep, and
      (d) determining in the first memory containing means the ending address for memory of the first memory containing means by adding a variable address space size of memory of the first memory containing means to the starting address for memory of the first memory containing means determined at sub-substep (B) (3) (c) of this substep;
   (4) calculating a starting address and an ending address for memory of a second memory containing means comprising the sub-substeps of,
      (a) transmitting the ending address for memory of the first memory determined at sub-substep (B) (3) (d) over the bus from the first memory containing means to the second memory containing means and in the second memory containing means assigning such ending address as the starting address for the memory of the second memory containing means, and
      (b) determining in the second memory containing means the ending address for memory of such second memory containing means by adding a variable address space size of a memory of the second memory containing means to the starting address for the memory of the second memory containing means transmitted and assigned at sub-substep (B) (4) (a) of this substep; and
   (5) calculating a starting address and an ending address for the memory of each of a third to a Nth memory containing means comprising the sub-substeps of,
      (a) transmitting separately the ending address for the memory for each the second to the Nth-1 memory containing means over the bus from the second to the Nth-1 memory containing means respectively to a third to a Nth memory containing means, and in the third to a Nth memory containing means assigning the respective ending addresses of the second to the Nth-1 memory containing means as the starting addresses for memory of the third to the Nth memory containing means, respectively, and (b) determining in the third to the Nth memory containing means the ending address for memory of such third to the Nth memory containing means by adding a variable address space size of memory of the third to the Nth memory containing means to the starting address for memory of the third to the Nth memory transmitted and assigned at sub-substep (B) (5) (a) of this substep; and (c) transmitting a signal over the bus from the memory controller and the first to the Nth-1 memory containing means to the first to the Nth memory containing means, respectively, and from the Nth memory containing means to the memory controller, indicative of the address on the bus being greater than the ending address of the local memory or the first to the Nth memory containing means when that condition exists.

5. The method as recited in claim 4, wherein the method further includes the step of transmitting a predetermined signal over the bus from the first to the Nth memory containing means to the CPU if the the first to the Nth memory containing means received a signal from the local memory and the first to the Nth-1 memory containing means, respectively, indicative of the address on the bus being greater than the ending address of the local memory and the first to the Nth-1 memory containing means.

6. A system for determining at predetermined times initialization addresses for total memory space of the system, the system including a plurality of elements coupled by a system bus, with each element comprising:
(1) a first portion that further comprises,
  (a) a central processing unit ("CPU") that causes an address to be retrieved from a first or second storage means, and transmitted to a second portion;
  (b) first storage means for storing an address that serves as a baseline starting address for a local memory and a basis from which a starting address for memory of a first emory containing means of the second portion is determined when the CPU of the element is a secondary CPU of the system;
  (c) second storage means for storing an address that serves as a baseline starting address for a local memory and a basis from which a starting address for memory of a first memory containing means of the second portion is determined when the CPU of the element is the primary CPU of the system;
  (d) a local memory having a first variable address space size that is connected to the CPU;
(2) a second portion that further comprises memory containing means having memory with a second variable address space size, with the memory containing means further including means for calculating a starting address for memory of the memory containing means based on the first variable address space size being added to the address transmitted to, and assigned as the starting address at, the memory containing means; and (3) an element bus coupling the CPU and the memory containing means.

7. The system as recited in claim 6, wherein the second portion further includes means for calculating an ending address for memory of the memory containing means based on a second variable address space size of memory of the memory containing means being added to the starting address for the memory for the memory containing means.

8. The system as recited in claim 7, wherein the memory containing means further comprises a first to a Nth discrete memory containing members, with each discrete memory containing member having a memory of a variable address space size and with the bus connecting the discrete memory containing members with each other and the CPU.

9. The system as recited in claim 8, wherein the first discrete memory containing member further includes means for calculating a starting address for the first discrete memory containing member based on the first variable address space size of the local memory being added to the address transmitted to, and assigned as a starting address at, the first memory containing member.

10. The system as recited in claim 9, wherein each second to Nth discrete memory containing member further includes means for calculating a starting address for each such second to Nth discrete memory containing member based respectively on a variable address space size of the memory of each first to Nth-1 discrete memory containing member added to a starting address of each first to Nth-1 discrete memory containing member.

11. The system as recited in claim 10, wherein each first to Nth discrete memory containing member further includes means for calculating an ending address for each such first to Nth discrete memory containing members based respectively on a variable address space size of memory of each first to Nth discrete memory containing member added to a starting address of each such first to Nth discrete memory containing member.

12. A system capable of determining if an address is located in total memory space of the system, the system including a plurality of elements coupled by a system bus, with each element comprising:
(1) a first portion that further comprises,
  (a) a central processing unit ("CPU") that causes an address to be retrieved from a first or second storage means and transmitted to a first memory containing means;
  (b) first storage means for storing an address that serves as a baseline starting address for a local memory and a basis from which a starting address for memory of a first memory containing means of the second portion is determined when the CPU of the element is a secondary CPU of the system;
  (c) second storage means for storing an address that serves as a baseline starting address for a local memory and a basis from which a starting address for memory of a first memory containing means of the second portion is determined when the CPU of the element is the primary CPU of the system;

(d) a local memory having a first variable address space size that is connected to the CPU;

(2) a second portion that further comprises first to Nth discrete memory containing means with each discrete memory containing means having memory with a variable address space size, with the first to Nth discrete memory containing means further comprising;

(a) the first discrete memory containing means having means for calculating the starting address based on the first variable address space size of the local memory being added to the starting address transmitted to, and assigned as a starting address at, the first discrete memory containing means;

(b) each of the second to the Nth discrete memory containing means having means for calculating a starting address for memory of each such second to the Nth discrete memory containing means based respectively on a variable address space size of memory of the first to the Nth-1 discrete memory containing means added to a starting address of the first to the Nth-1 discrete memory containing means;

(c) each first to Nth discrete memory containing means having means for calculating an ending address based respectively on a variable address space size of memory of the first to Nth discrete memory containing means being added to the staring address of each such first to Nth discrete memory containing means; and (3) the first portion and each first to Nth discrete memory containing means having means for comparing an address generated and placed on a bus by a system CPU with an ending address for the local memory and memory of each first to Nth discrete memory containing means and means for transmitting a signal over the bus respectively from the first portion and first to the Nth-1 discrete memory containing means to the first to the Nth discrete memory containing means, and from the Nth discrete memory containing means to the first portion, indicative of the address on the bus being greater than the ending address of the local memory or the first to the Nth memory containing means when that condition exists.

13. The system as recited in claim 12, wherein each first to Nth discrete memory containing means further includes means for transmitting a signal over the bus from each such first to Nth memory containing means to the CPU if the first to Nth memory containing means received a signal from the local memory and the first to the Nth-1 memory containing means, respectively, indicative of the address on the bus being greater than the ending address of the local memory and the first to the Nth-1 discrete memory containing means.

14. The system as recited in claim 13, wherein the CPU and the local memory are disposed on a single board.

15. The method as recited in claim 1, 3, or 4, wherein if the CPU is the primary CPU the storage means is the memory controller.

16. The method as recited in claim 1, 3, or 4, wherein if the CPU is other than the primary CPU the storage means is the interface.

17. The system as recited in claim 6 or 12, wherein the second storage means includes a memory controller disposed in the first portion.

18. The system as recited in claim 6 or 12, wherein the first storage means includes an interface disposed in the first portion for connecting an element to other system elements

* * * * *